(12) United States Patent
Anami et al.

(10) Patent No.: US 11,130,645 B2
(45) Date of Patent: Sep. 28, 2021

(54) MEDIUM TRANSPORTING DEVICE, IMAGE READING APPARATUS, AND RECORDING APPARATUS

(71) Applicant: SEIKO EPSON CORPORATION, Tokyo (JP)

(72) Inventors: Akira Anami, Kitakyushu (JP); Naoki Sakamoto, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 16/145,508

(22) Filed: Sep. 28, 2018

(65) Prior Publication Data
US 2019/0100394 A1    Apr. 4, 2019

(30) Foreign Application Priority Data

Sep. 29, 2017 (JP) .............................. JP2017-189833

(51) Int. Cl.
*B65H 5/06* (2006.01)
*H04N 1/00* (2006.01)

(52) U.S. Cl.
CPC ......... *B65H 5/062* (2013.01); *H04N 1/00602* (2013.01); *H04N 1/00994* (2013.01); *B65H 2402/232* (2013.01); *B65H 2404/1341* (2013.01); *B65H 2404/144* (2013.01); *B65H 2404/1431* (2013.01); *B65H 2404/174* (2013.01)

(58) Field of Classification Search
CPC ................... B65H 2404/1341; B65H 2404/144
See application file for complete search history.

(56) References Cited

U.S. PATENT DOCUMENTS

| 5,884,909 A * | 3/1999 | Umeda ..................... B65H 5/06 271/242 |
| 6,494,451 B2 * | 12/2002 | Michel ................... B65H 5/062 101/DIG. 35 |
| 7,401,915 B2 | 7/2008 | Sasa et al. |
| 9,690,237 B2 | 6/2017 | Miyakoshi |
| 2005/0189701 A1 * | 9/2005 | Nagura ................. B65H 3/5261 271/167 |
| 2006/0023053 A1 | 2/2006 | Sasa et al. |

(Continued)

FOREIGN PATENT DOCUMENTS

| CN | 2871206 | 2/2007 |
| CN | 105954989 | 9/2016 |
| JP | H07-010313 | 1/1995 |

(Continued)

*Primary Examiner* — Howard J Sanders
(74) *Attorney, Agent, or Firm* — Workman Nydegger

(57) ABSTRACT

A medium transporting device includes a driving roller that transports a medium and that is driven to rotate, a driven roller that nips the medium between the driving roller and the driven roller and rotates in accordance with the rotation of the driving roller, a rotary shaft of the driven roller, a first pressing member that presses the rotary shaft in a direction in which the driven roller comes into contact with the driving roller, a second pressing member that presses the rotary shaft in a direction in which the driven roller comes into contact with the driving roller, and a spacer member that is integrally provided with a first spacer interposed between the rotary shaft and the first pressing member and a second spacer interposed between the rotary shaft and the second pressing member.

19 Claims, 18 Drawing Sheets

(56) References Cited

U.S. PATENT DOCUMENTS

2012/0234655 A1* 9/2012 Dong ................ H04N 1/00795
  198/780
2016/0266522 A1 9/2016 Miyakoshi

FOREIGN PATENT DOCUMENTS

| JP | H10-190938 | 7/1998 |
| JP | 11-246070 A | 9/1999 |
| JP | 2003-221143 | 8/2003 |
| JP | 2009-203065 | 9/2009 |
| JP | 4497751 B | 4/2010 |

* cited by examiner

MEDIUM TRANSPORTING DEVICE, IMAGE READING APPARATUS, AND RECORDING APPARATUS

BACKGROUND

1. Technical Field

The present invention relates to a medium transporting device transporting a medium, an image reading apparatus provided with the medium transporting device, and a recording apparatus.

2. Related Art

A facsimile machine, a printer, or the like, which is an example of a recording apparatus, is provided with a pair of rollers that nips and transports a recording sheet, which is an example of a medium. In addition, there is a case where the pair of rollers is configured with a driving roller to which a torque is transmitted from a drive source such as a motor such that the driving roller is driven to rotate and a driven roller which nips the recording sheet between the driving roller and the driven roller and rotates in accordance with the rotation of the driving roller. The driven roller is urged toward the driving roller by a spring in many cases.

Japanese Patent No. 4497751 discloses a sheet transporting device which is provided with a driving roller, a driven pressure roller, a pressure roller shaft that pivotally supports the driven pressure roller, and a spring member that urges the pressure roller shaft and in which a vibration proof member is interposed between the pressure roller shaft and the spring member in order to reduce an abnormal driving noise which is caused by vibration accompanied by rotation of a roller.

In the sheet transporting device disclosed in Japanese Patent No. 4497751, the vibration proof member is interposed between the pressure roller shaft and the spring member in consideration of a problem that the spring member vibrates due to vibration that is generated when the driven pressure roller rotates at a high speed and thus an abnormal noise is generated.

However, even when the abnormal noise is suppressed, vibration accompanied by rotation of the driven pressure roller is still generated. Particularly, when the vibration proof member is not appropriately held in a sheet feeding direction, the pressure roller shaft moves in the sheet feeding direction inside a bearing portion due to vibration between the pressure roller shaft and the bearing portion that supports the pressure roller shaft. As a result, there is a decrease in feeding accuracy and an unpleasant abnormal noise is generated.

SUMMARY

An advantage of some aspects of the invention is to further suppress an adverse effect on a sheet feeding accuracy and the generation of an abnormal noise in a medium transporting device having a configuration in which a driven roller is pressed against a driving roller.

According to an aspect of the invention, there is provided a medium transporting device including a driving roller that transports a medium and that is driven to rotate, a driven roller that nips the medium between the driving roller and the driven roller and rotates in accordance with the rotation of the driving roller, a rotary shaft of the driven roller, a first pressing member that is disposed close to one axial end of the rotary shaft and that presses the rotary shaft in a direction in which the driven roller comes into contact with the driving roller, a second pressing member that is disposed close to the other axial end of the rotary shaft and that presses the rotary shaft in a direction in which the driven roller comes into contact with the driving roller, and a spacer member that is integrally provided with a first spacer interposed between the rotary shaft and the first pressing member and a second spacer interposed between the rotary shaft and the second pressing member.

In this case, the first spacer is interposed between the rotary shaft and the first pressing member at a position close to the one axial end of the rotary shaft of the driven roller and the second spacer is interposed between the rotary shaft and the second pressing member at a position close to the other axial end of the rotary shaft. In addition, the first spacer and the second spacer are integrally provided with the spacer member. Therefore, it is possible to suppress vibration of the first spacer and the second spacer in the medium transportation direction in comparison with a configuration in which each of the first spacer and the second spacer is separately provided. As a result, it is possible to suppress movement (vibration) of the rotary shaft in the medium transportation direction and to further suppress an adverse effect on a medium feeding accuracy or the generation of an abnormal noise.

The medium transporting device may further include a bearing portion that supports the rotary shaft, and a surface of each of the first spacer and the second spacer, which presses the rotary shaft, may be formed as an inclined surface that generates a force component that presses the rotary shaft in a medium transportation direction in the bearing portion.

In this case, the bearing portion that supports the rotary shaft is provided and the surface of each of the first spacer and the second spacer, which presses the rotary shaft, is formed as the inclined surface that generates the force component that presses the rotary shaft in the medium transportation direction in the bearing portion. Therefore, it is possible to more favorably suppress movement (vibration) of the rotary shaft in the medium transportation direction.

In the medium transporting device, the inclined surface may be a surface that presses the rotary shaft to a downstream side in the medium transportation direction.

The rotary shaft is urged to move to the downstream side in the medium transportation direction when the medium is transported. In addition, in this case, since the inclined surface is a surface that presses the rotary shaft to the downstream side in the medium transportation direction, a direction in which the first pressing member and the second pressing member press the rotary shaft and a direction in which the rotary shaft is urged to move when the medium is transported coincide with each other. Therefore, the rotary shaft is reliably drawn to the downstream side in the medium transportation direction and thus it is possible to more favorably suppress movement (vibration) of the rotary shaft in the medium transportation direction.

In the medium transporting device, a rotary shaft center of the driven roller may be offset from a rotary shaft center of the driving roller toward an upstream side in the medium transportation direction.

Note that, the expression "medium transportation direction" used here does not mean a direction parallel to a tangent line to a contact position between the driving roller and the driven roller and means a medium transportation direction that can be figured out from a medium transportation path (details will be described later).

In this case, the rotary shaft center of the driven roller is offset from the rotary shaft center of the driving roller toward the upstream side in the medium transportation direction. Therefore, the rotary shaft is urged to move to the upstream side in the medium transportation direction with the rotary shaft being pressed by the first pressing member and the second pressing member (in direction in which driven roller is pressed against driving roller and in which driven roller comes into contact with driving roller). However, the rotary shaft is urged to move to the downstream side in the medium transportation direction when the medium is transported. As a result, the position of the rotary shaft is not likely to be fixed and thus the rotary shaft is likely to move (vibrate) in the medium transportation direction.

However, since the inclined surface presses the rotary shaft toward the downstream side in the medium transportation direction because of the above-described effect, movement (vibration) of the rotary shaft in the medium transportation direction can be suppressed.

In the medium transporting device, the driving roller and the driven roller may press the medium toward a path forming member that is provided on an upstream side or a downstream side of the driving roller and the driven roller in the medium transportation direction, and the driving roller may be positioned on the path forming member side.

In this case, it is possible to achieve the same effect as above with a configuration in which the driving roller and the driven roller press the medium toward the path forming member that is provided on the upstream side or the downstream side of the driving roller and the driven roller in the medium transportation direction and the driving roller is positioned on the path forming member side.

In the medium transporting device, a pair of rollers that transports the medium and a pair of rollers that is positioned on a downstream side of the pair of rollers and that transports the medium may be provided and the driving roller and the driven roller may constitute the pair of rollers provided on the downstream side.

In this case, it is possible to achieve the same effect as above with a medium transporting device in which the pair of rollers are provided on the upstream side and the downstream side in the medium transportation direction and the driving roller and the driven roller constitute the pair of rollers provided on the downstream side.

The medium transporting device may further include a frame to which the spacer member is attached, and the spacer member may be provided with a restricting portion that restricts a direction in which the spacer member is attached to the frame.

In this case, the frame to which the spacer member is attached is provided and the spacer member is provided with the restricting portion that restricts a direction in which the spacer member is attached to the frame. Therefore, it is possible to suppress the spacer member being attached in a wrong direction.

In the medium transporting device, each of the first pressing member and the second pressing member may be configured with a coil spring and a projection that is inserted into the coil spring may be formed on each of the first spacer and the second spacer.

In this case, each of the first pressing member and the second pressing member is configured with a coil spring and the projection that is inserted into the coil spring is formed on each of the first spacer and the second spacer. Therefore, a positional relationship between the coil spring and the first spacer and a positional relationship between the coil spring and the second spacer are stabilized and thus it is possible to further suppress movement (vibration) of the rotary shaft in the medium transportation direction.

The medium transporting device may further include a third pressing member that is disposed close to the one axial end of the rotary shaft and that presses the rotary shaft in a direction in which the driven roller comes into contact with the driving roller and a fourth pressing member that is disposed close to the other axial end of the rotary shaft and that presses the rotary shaft in a direction in which the driven roller comes into contact with the driving roller and a gap may be formed between the third pressing member and the rotary shaft and between the fourth pressing member and the rotary shaft in a state where the driving roller and the driven roller are in contact with each other and pressing forces from the third pressing member and the fourth pressing member may act on the rotary shaft when the driven roller is separated from the driving roller by a predetermined distance.

In order to accurately transport a thick medium, it is preferable to secure a large pressing force that presses the driven roller toward the driving roller. However, when a large pressing force that presses the driven roller toward the driving roller is secured, a load for driving the driving roller becomes large even when a medium that is not thick is transported and thus heat generation of a drive source such as a motor driving the driving rollers becomes significant, which is not preferable.

In this case, since the third pressing member and the fourth pressing member are provided separately from the first pressing member and the second pressing member such that the gap is formed between the third pressing member and the rotary shaft and between the fourth pressing member and the rotary shaft in a state where the driving roller and the driven roller are in contact with each other, the pressing forces from the third pressing member and the fourth pressing member do not act on the rotary shaft when a medium that is not thick is transported. Therefore, it is possible to suppress a load for driving the driving roller.

In addition, when a thick medium is transported, the driven roller is separated from the driving roller by a predetermined distance such that the pressing forces from the third pressing member and the fourth pressing member act on the rotary shaft and thus the thick medium can be reliably transported.

Accordingly, a period in which a load for driving the driving roller becomes large can be limited only to a period in which a large load needs to be applied and thus it is possible to suppress heat generated from a drive source such as a motor driving the driving roller.

In the medium transporting device, a third spacer may be interposed between the rotary shaft and the third pressing member, a fourth spacer may be interposed between the rotary shaft and the fourth pressing member, and the third spacer and the fourth spacer may be integrally formed with each other.

In this case, the third spacer is interposed between the rotary shaft and the third pressing member, the fourth spacer is interposed between the rotary shaft and the fourth pressing member, and the third spacer and the fourth spacer are integrally formed with each other. Therefore, vibration of the third spacer and the fourth spacer in the medium transportation direction is suppressed. As a result, it is possible to suppress movement (vibration) of the rotary shaft in the medium transportation direction and to further suppress an adverse effect on the medium feeding accuracy or the generation of an abnormal noise.

According to another aspect of the invention, there is provided an image reading apparatus including a reading unit that reads a surface of a medium and the medium transporting device according to the above-described aspect.

In this case, it is possible to achieve the same effect as the above-described aspect with the image reading apparatus.

According to still another aspect of the invention, there is provided a recording apparatus including a recording unit that performs recording on a medium and the medium transporting device according to the above-described aspect.

In this case, it is possible to achieve the same effect as the above-described aspect with the recording apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
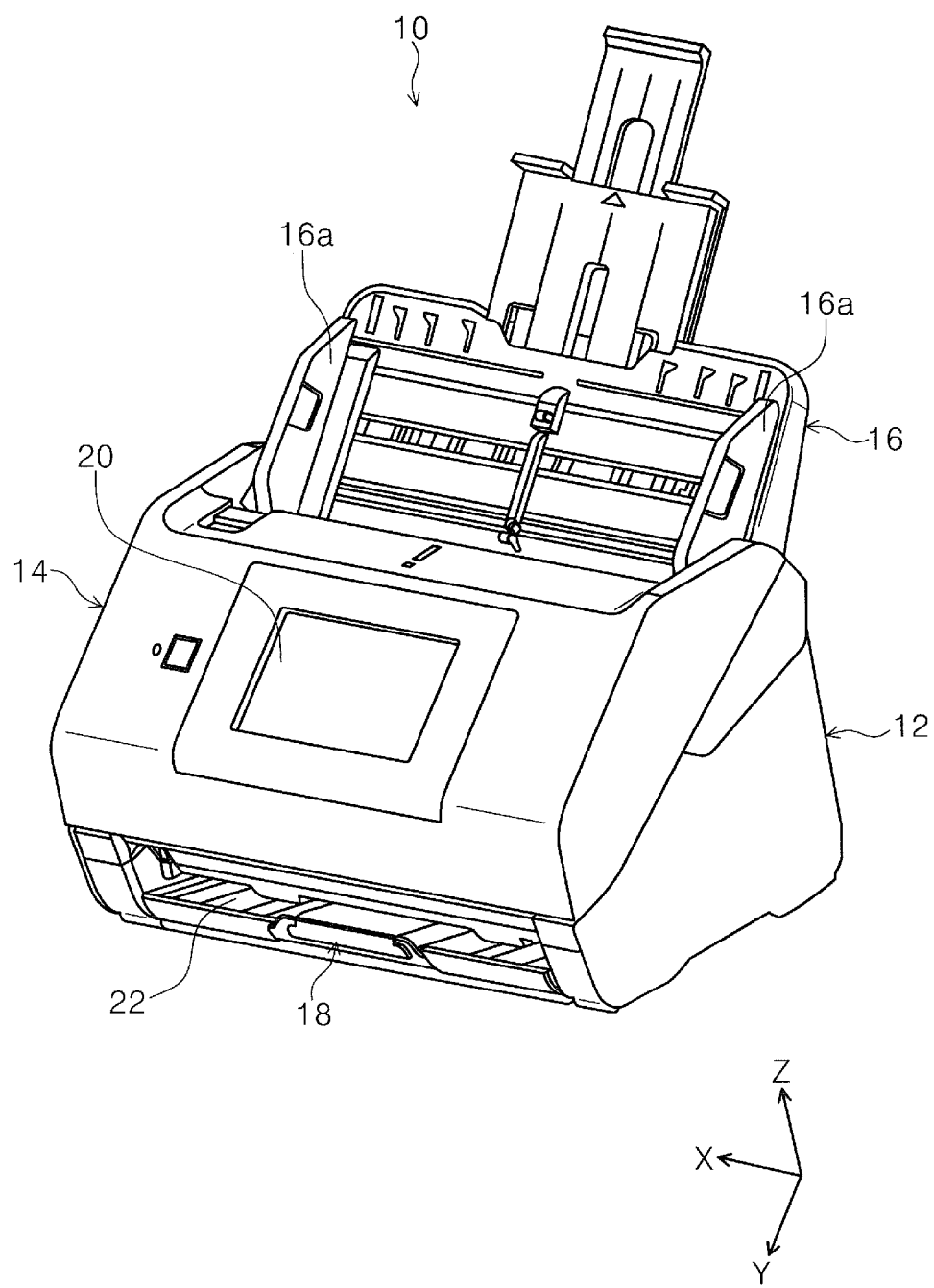
FIG. 1 is a perspective view of an outer appearance of a scanner according to a first embodiment.

Hereinafter, embodiments of the invention will be described based on the drawings. Note that, the same components in the embodiments will be given the same reference numerals. Description thereof will be made in only in a first embodiment and will be omitted in subsequent embodiments.

Figure 2:
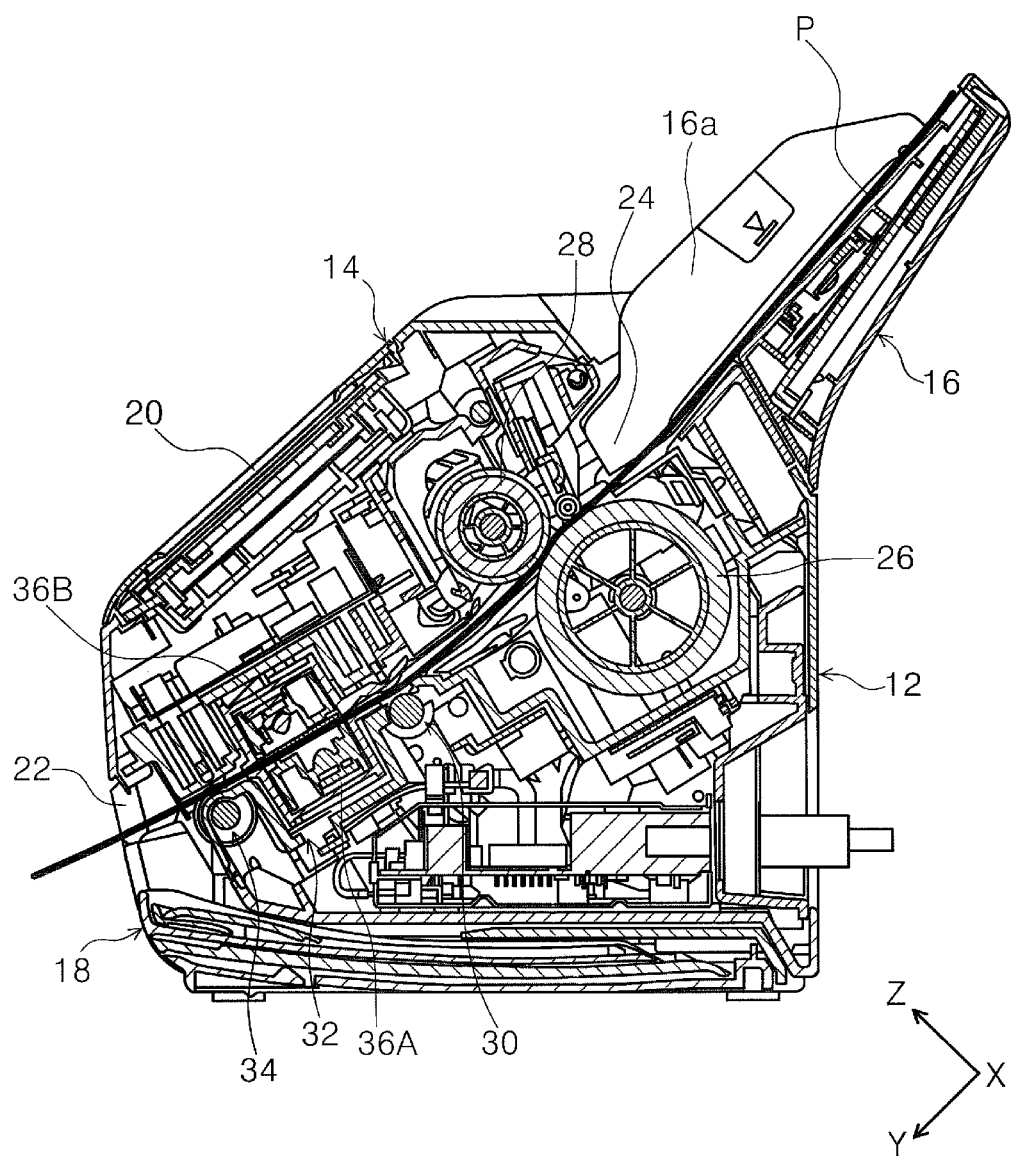
FIG. 2 is a side sectional view illustrating a medium transportation path of the scanner according to the first embodiment.
Figure 3:
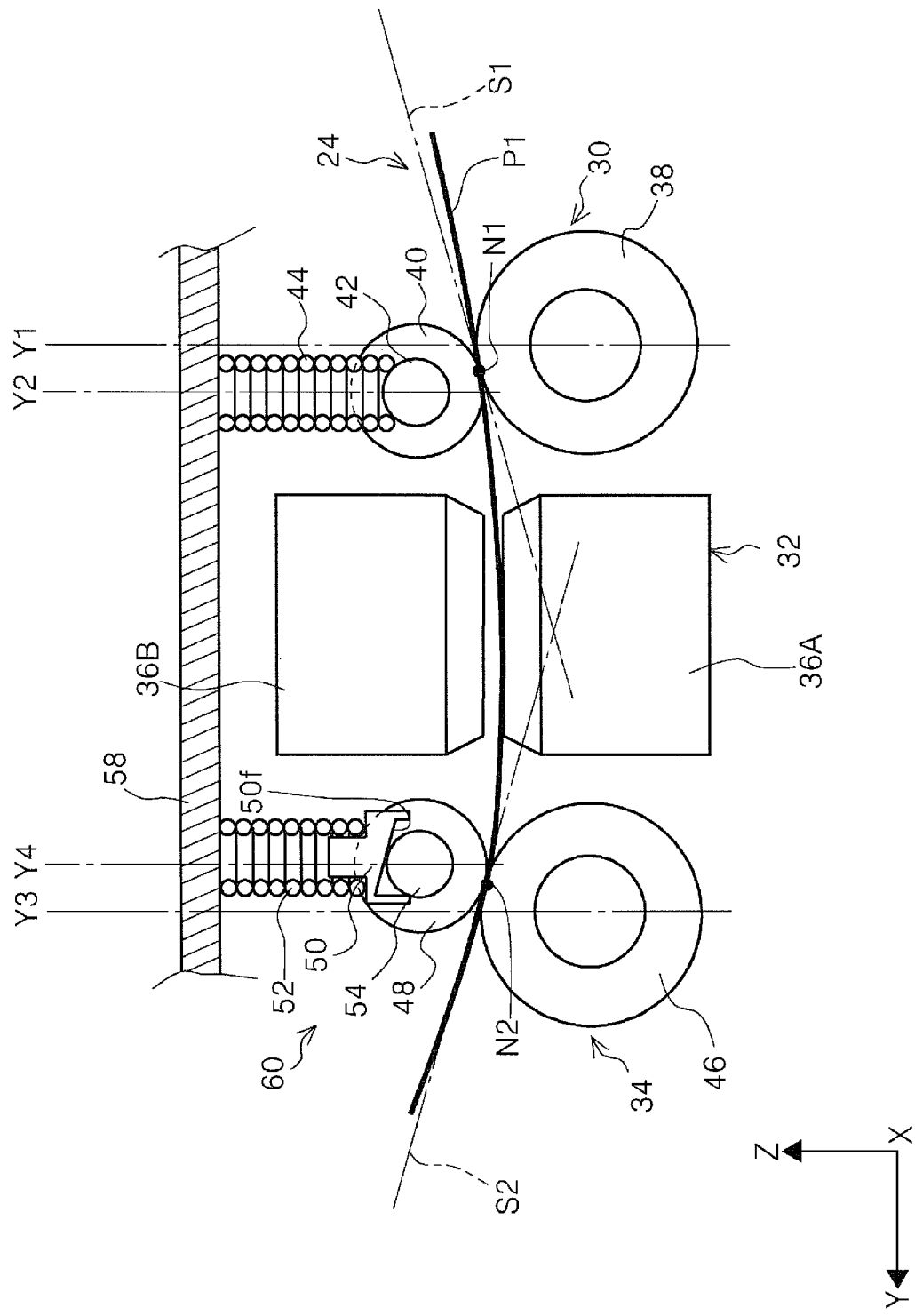
FIG. 3 is a schematic diagram illustrating a configuration in the vicinity of an image reading unit in the medium transportation path of the scanner according to the first embodiment.

FIG. 1 is a perspective view of an outer appearance of a scanner according to the first embodiment, FIG. 2 is a side sectional view illustrating a medium transportation path of the scanner according to the first embodiment, and FIG. 3 is a schematic diagram illustrating a configuration in the vicinity of an image reading unit in the medium transportation path of the scanner according to the first embodiment.

Figure 4:
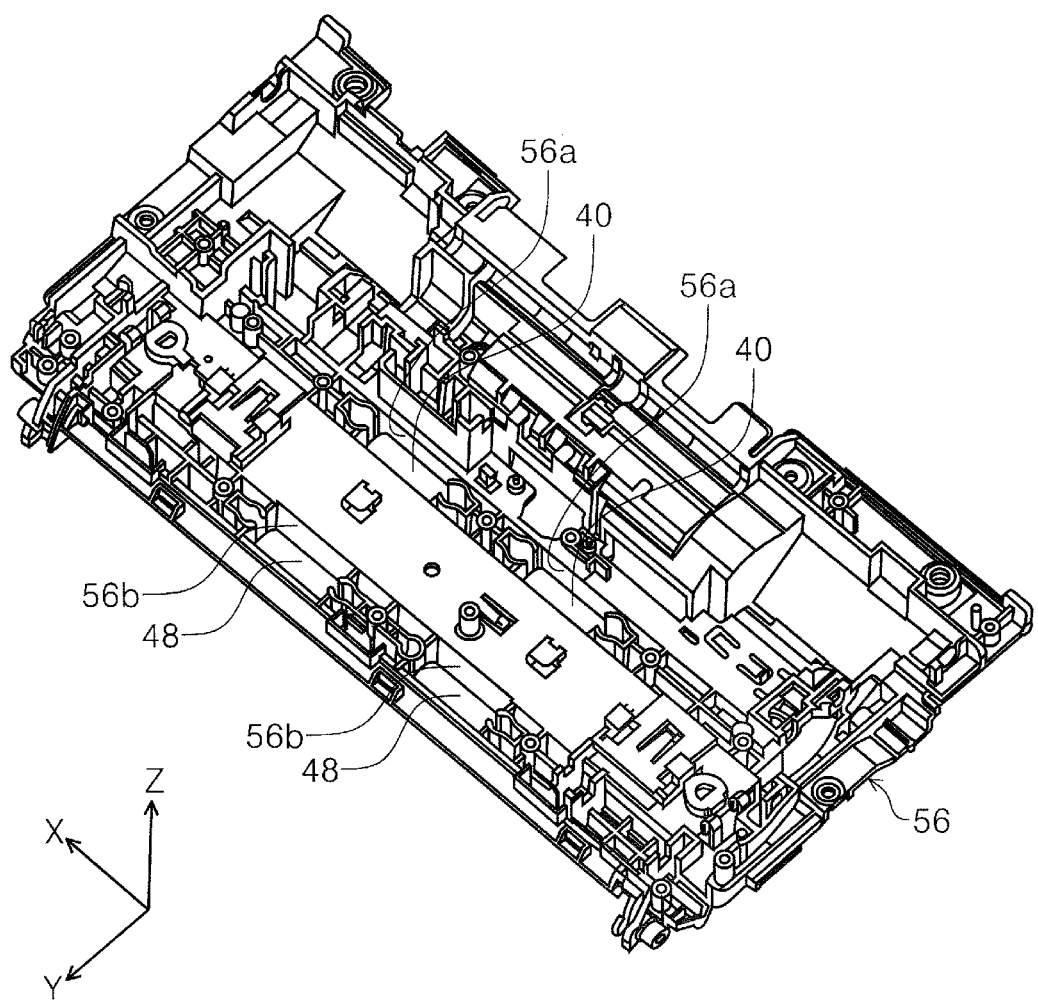
FIG. 4 is a perspective view illustrating a state where a driven roller is disposed in a frame.
Figure 5:
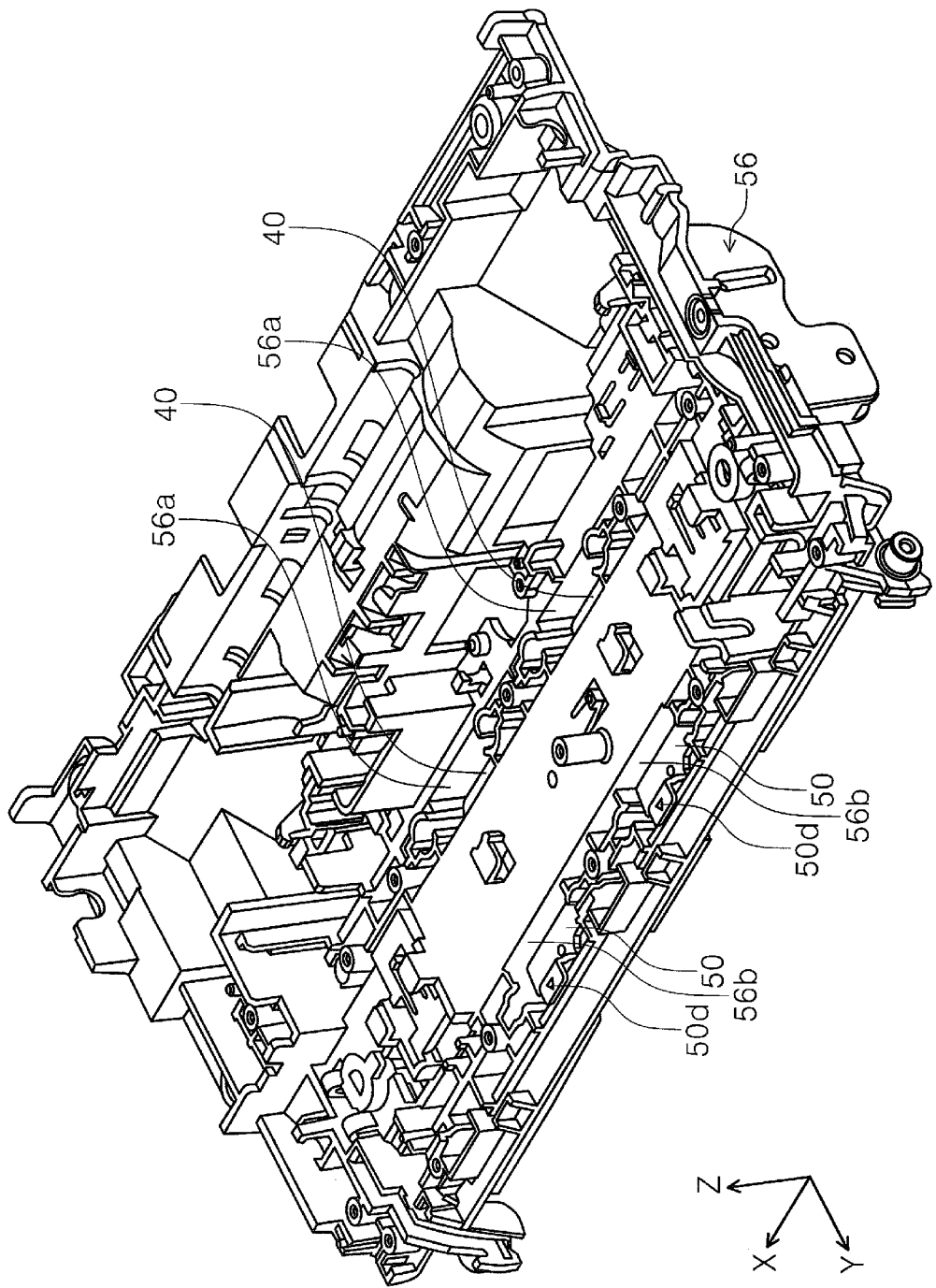
FIG. 5 is a perspective view illustrating a state where a spacer member is disposed in the frame in addition to the driven roller.
Figure 6:
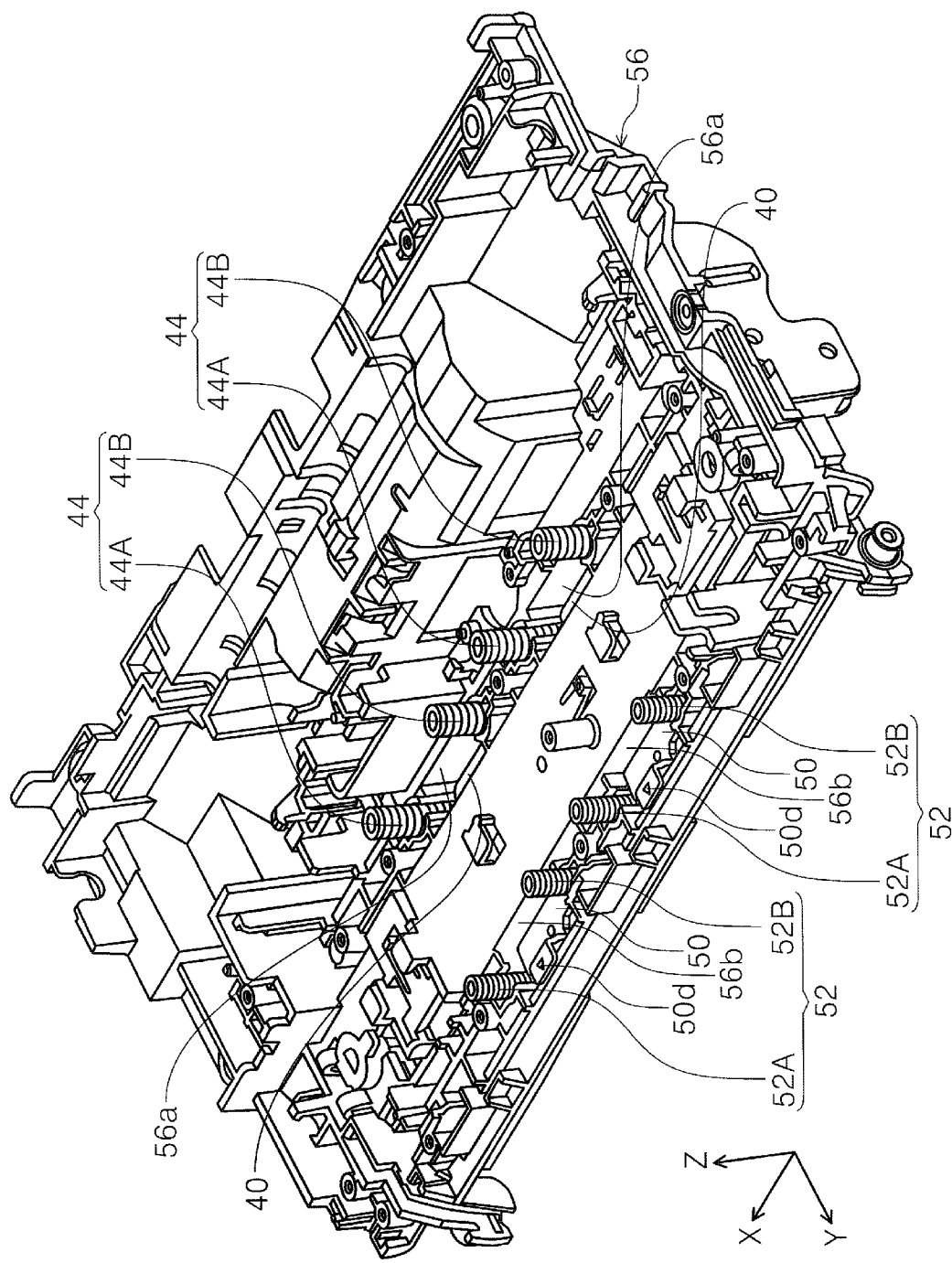
FIG. 6 is a perspective view illustrating a state where a pressing member is disposed in the frame in addition to the driven roller and the spacer member.
Figure 7:
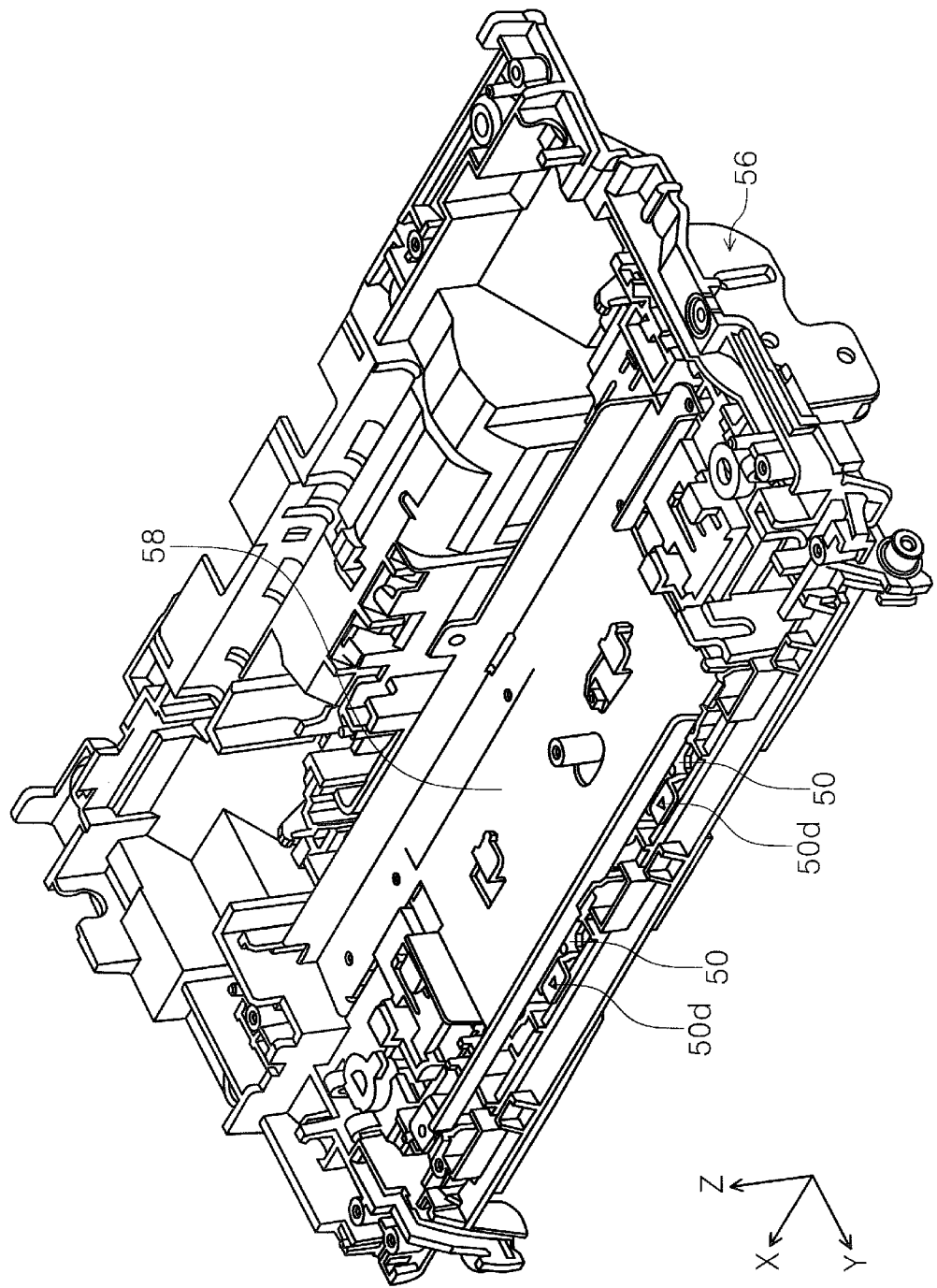
FIG. 7 is a perspective view illustrating a state where a holding member is disposed on an upper portion of the frame.
Figure 8:
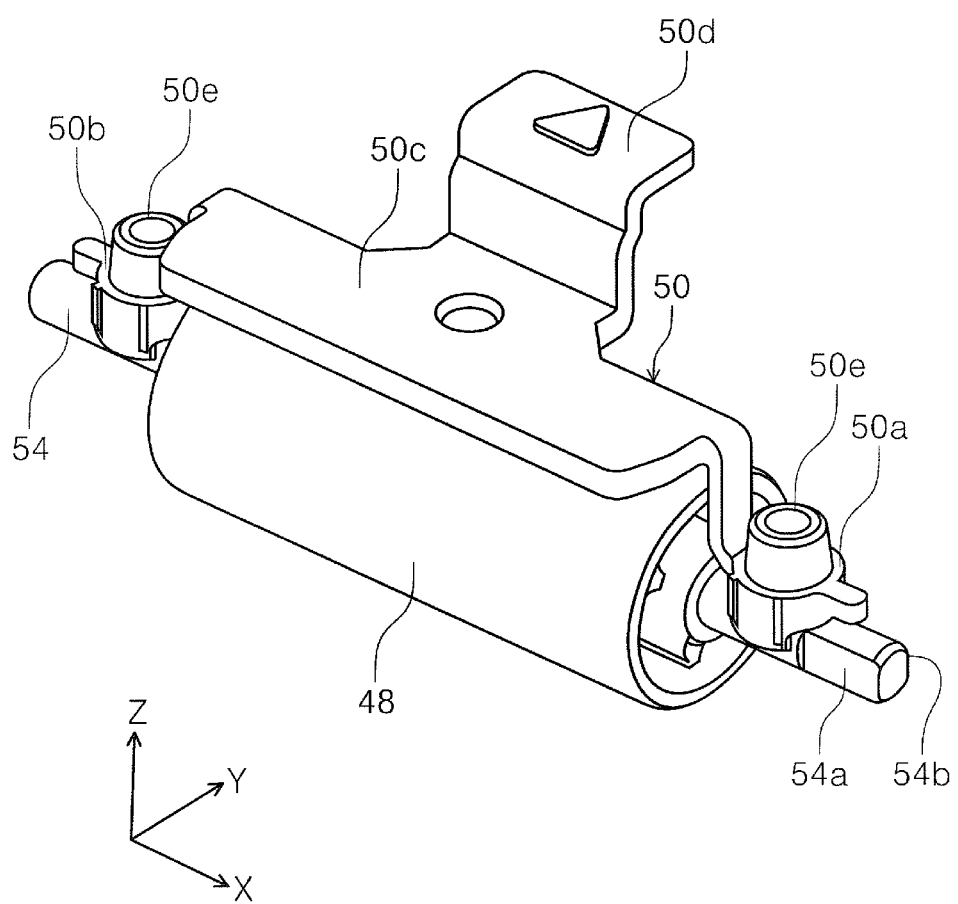
FIG. 8 is a perspective view illustrating the driven roller and the spacer member according to the first embodiment.

FIG. 4 is a perspective view illustrating a state where a driven roller is disposed in a frame, FIG. 5 is a perspective view illustrating a state where a spacer member is disposed in the frame in addition to the driven roller, FIG. 6 is a perspective view illustrating a state where a pressing member is disposed in the frame in addition to the driven roller and the spacer member, FIG. 7 is a perspective view illustrating a state where a holding member is disposed on an upper portion of the frame, and FIG. 8 is a perspective view illustrating the driven roller and the spacer member according to the first embodiment.

Figure 9:
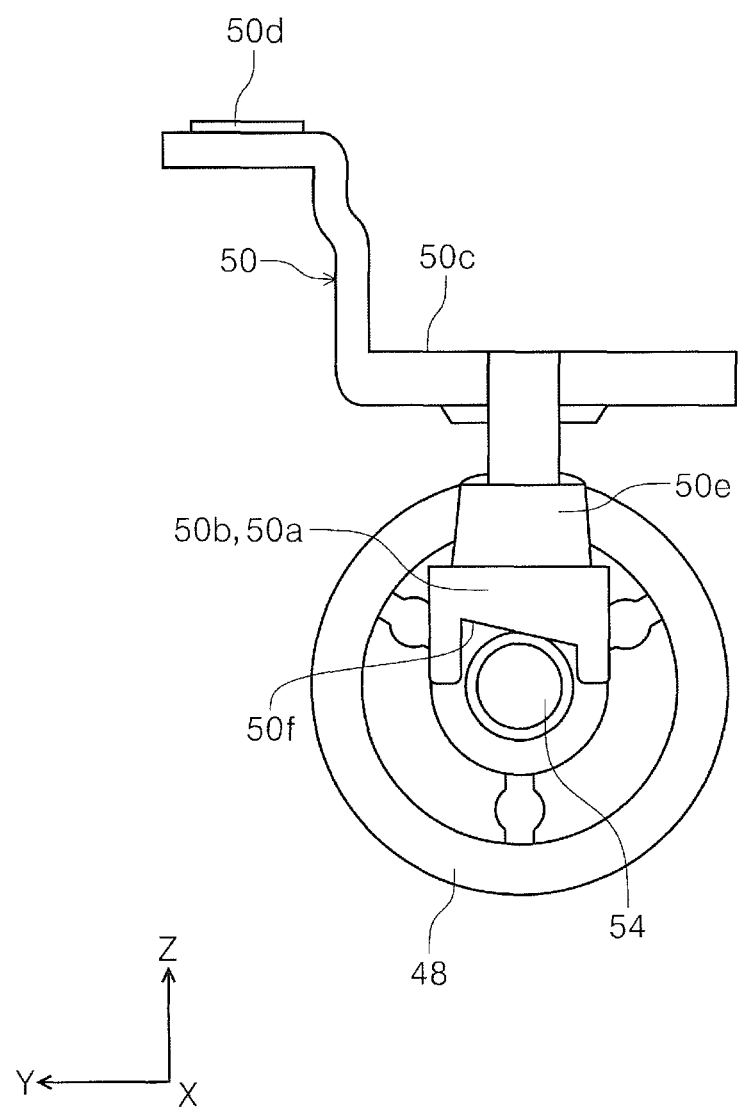
FIG. 9 is a side view illustrating the driven roller and the spacer member according to the first embodiment.
Figure 10:
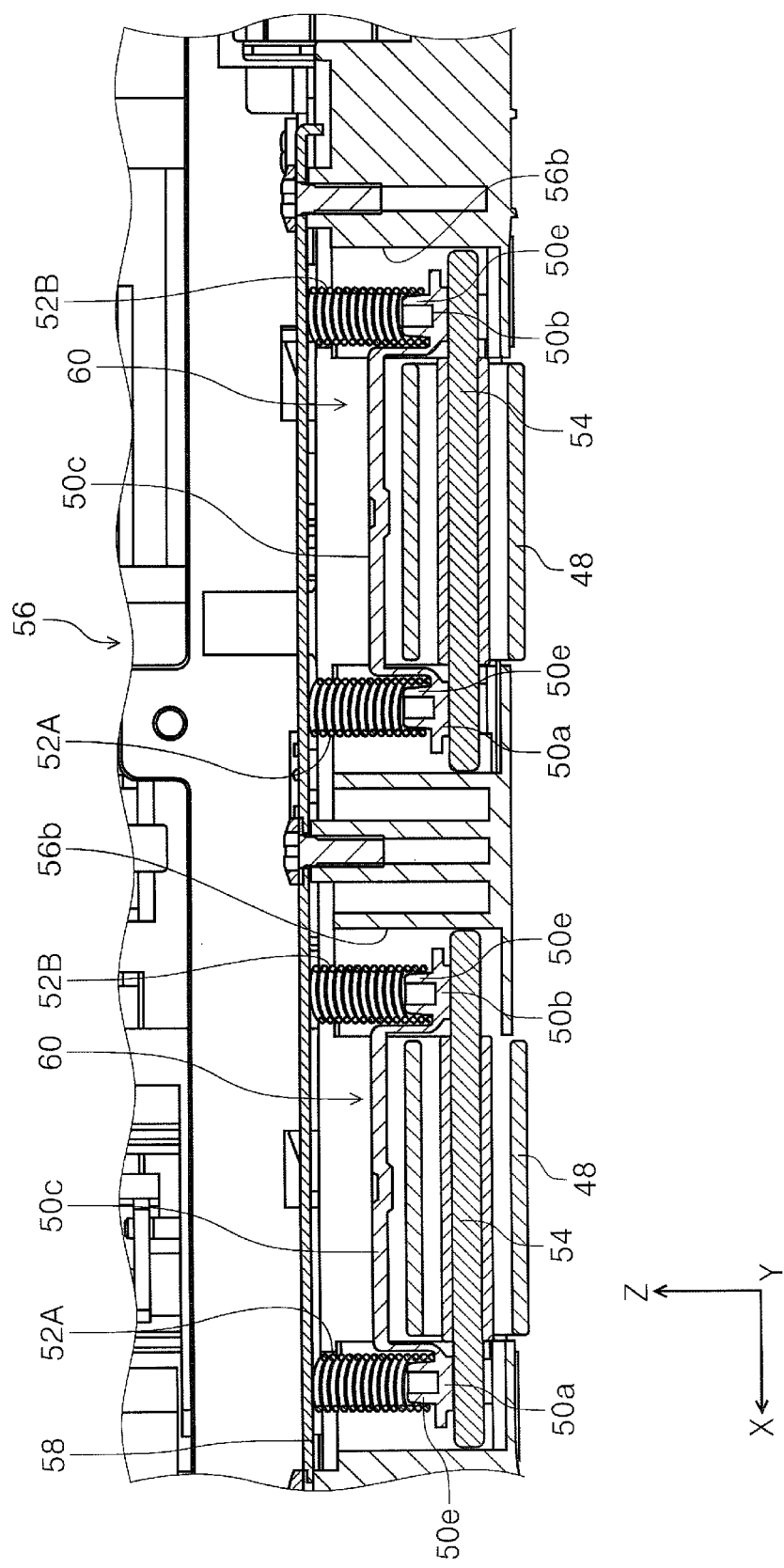
FIG. 10 is a sectional view illustrating the driven roller, the spacer member, and the pressing member disposed in the frame.
Figure 11:
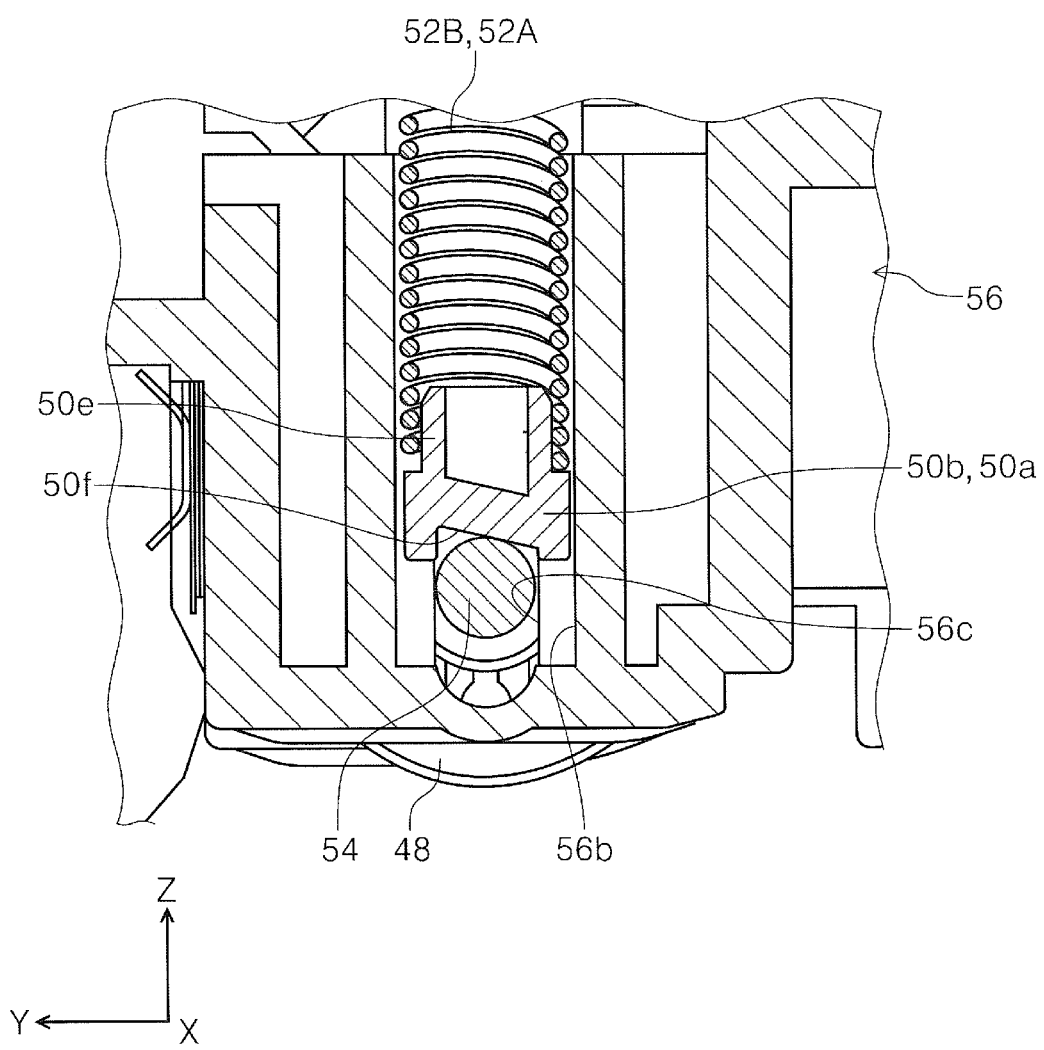
FIG. 11 is a side sectional view illustrating the driven roller, the spacer member, and the pressing member disposed in the frame.
Figure 12:
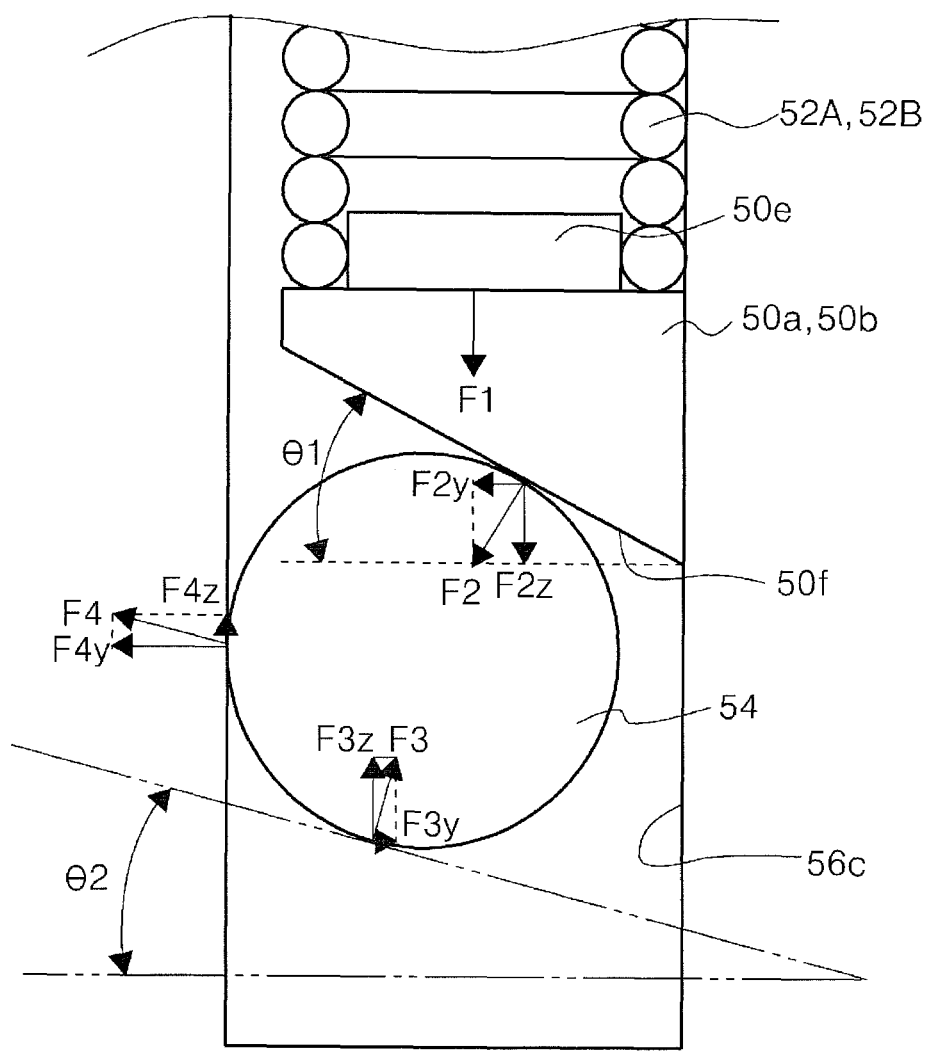
FIG. 12 is a schematic diagram illustrating a relationship between forces acting on the driven roller and the spacer member.

FIG. 9 is a side view illustrating the driven roller and the spacer member according to the first embodiment, FIG. 10 is a sectional view illustrating the driven roller, the spacer member, and the pressing member disposed in the frame, FIG. 11 is a side sectional view illustrating the driven roller, the spacer member, and the pressing member disposed in the frame, and FIG. 12 is a schematic diagram illustrating a relationship between forces acting on the driven roller and the spacer member.

Figure 13:
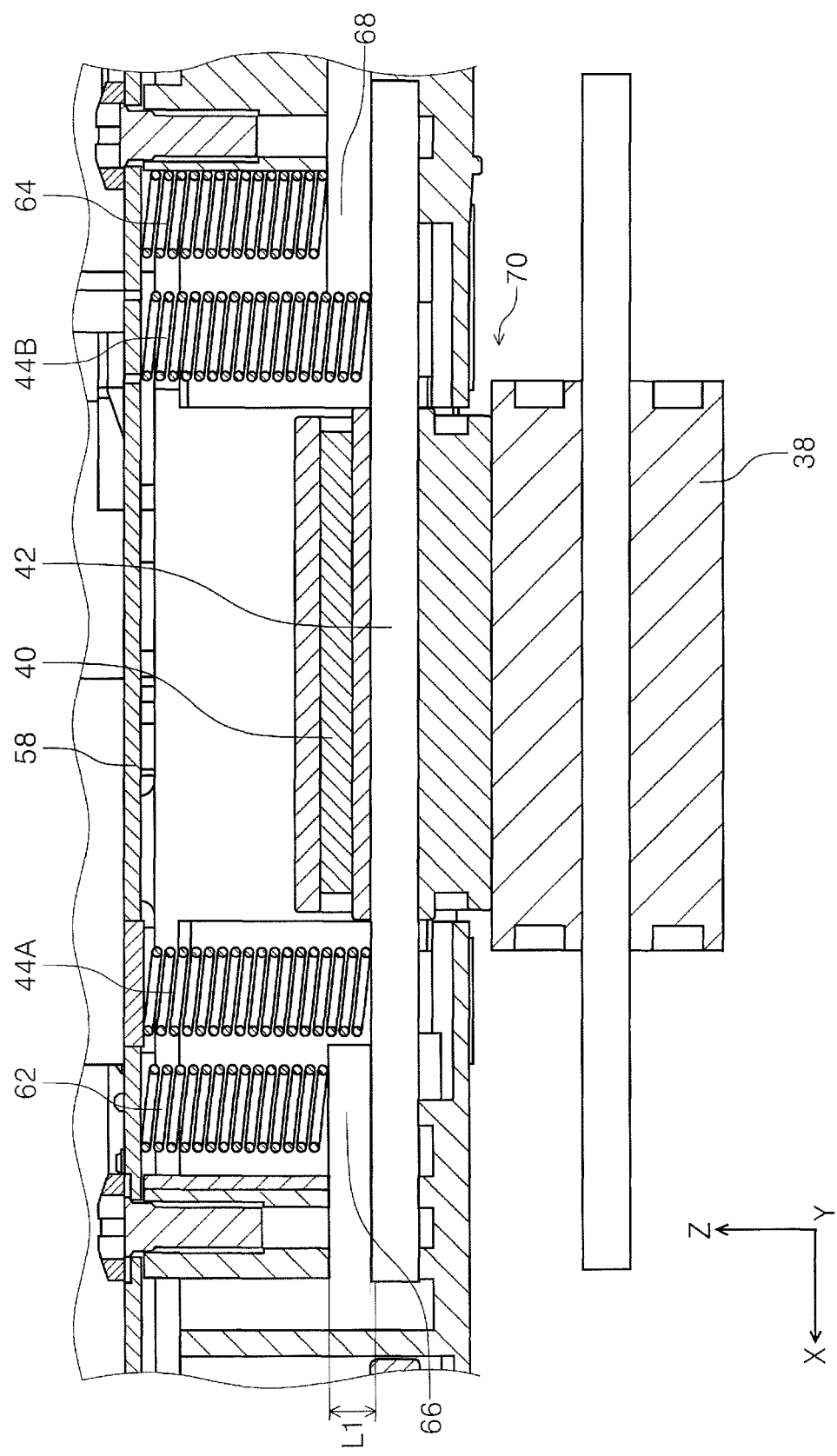
FIG. 13 is a sectional view illustrating a relationship between a driven roller and a pressing member according to a third embodiment.
Figure 14:
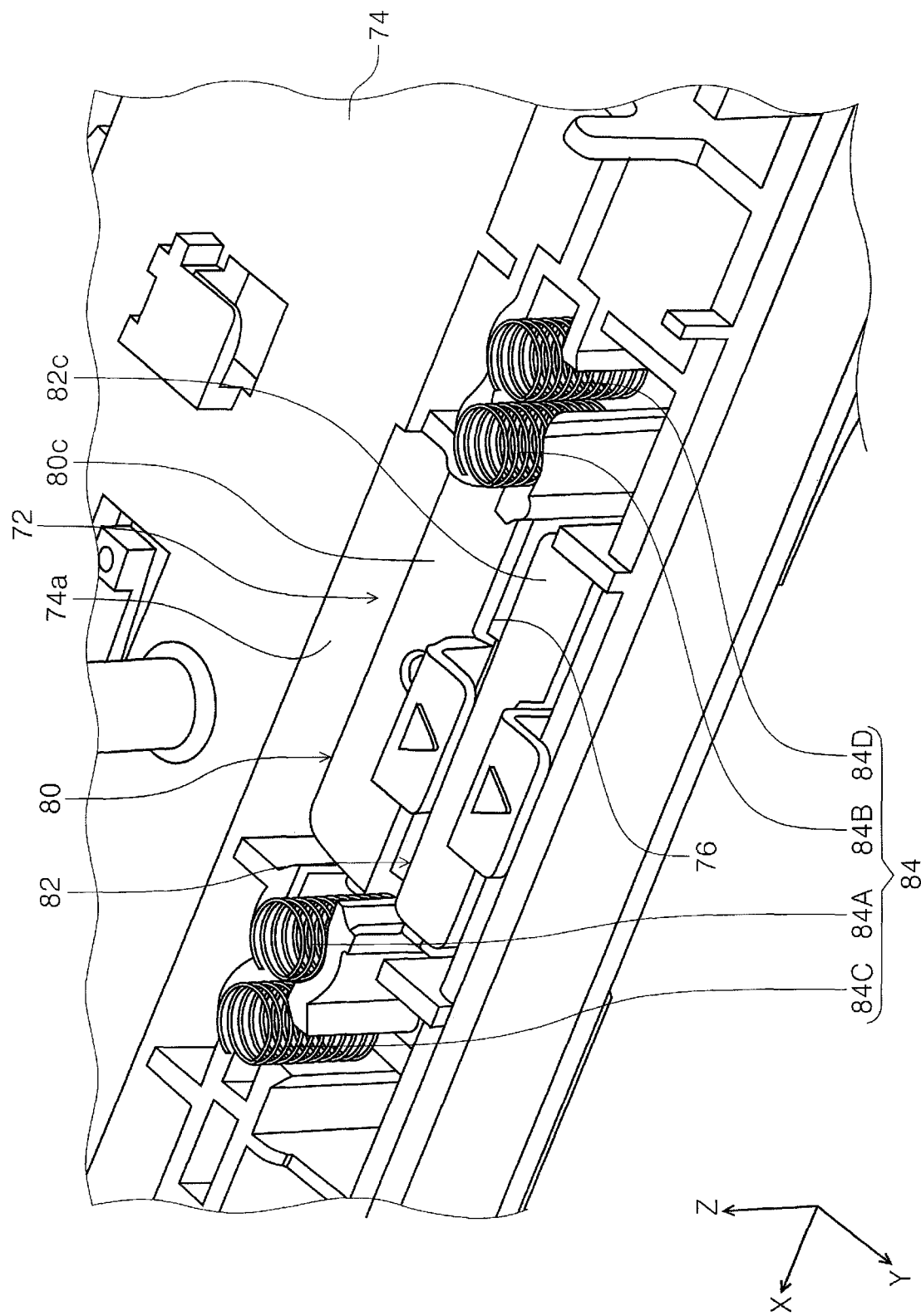
FIG. 14 is a perspective view illustrating a state where a spacer member and a pressing member according to a second embodiment are disposed in a frame.
Figure 15:
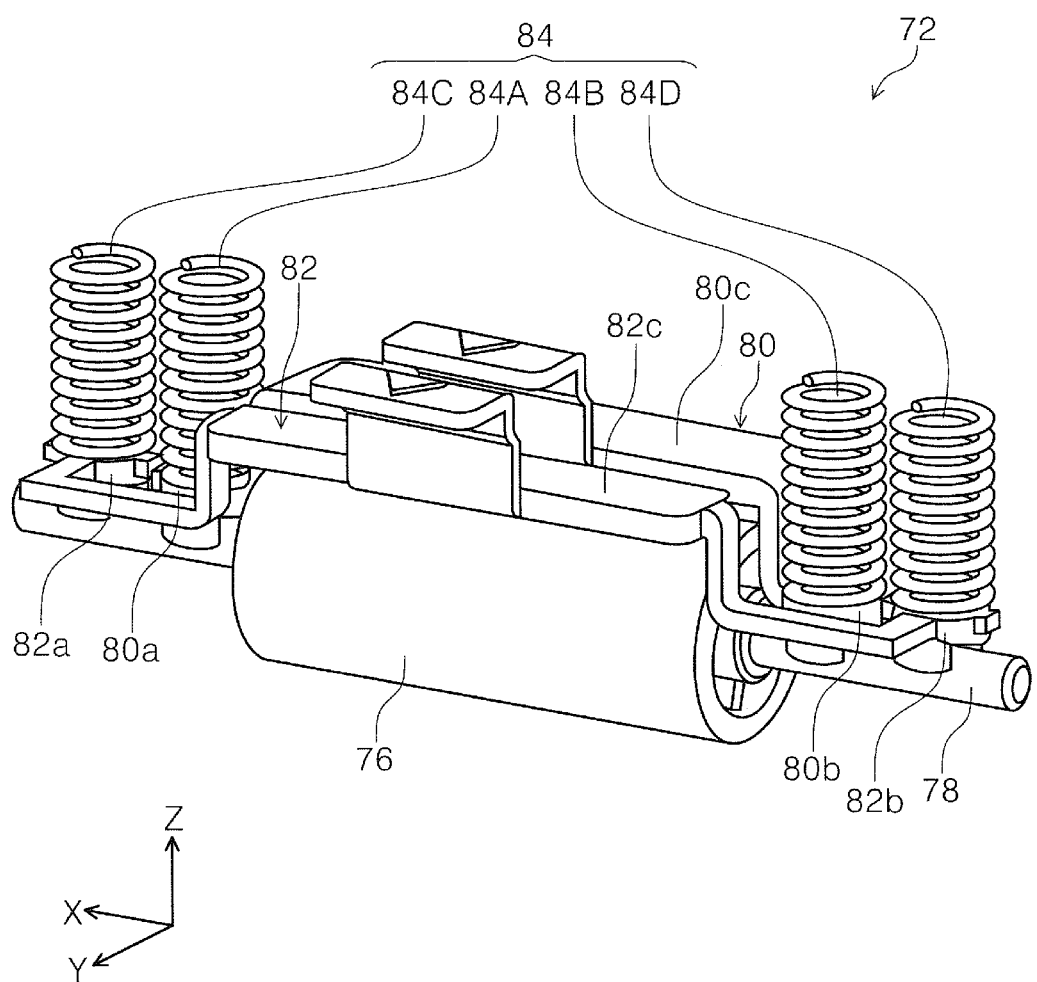
FIG. 15 is a perspective view illustrating a relationship between a driven roller, the spacer member, and the pressing member according to the second embodiment.

FIG. 13 is a sectional view illustrating a relationship between a driven roller and a pressing member according to a third embodiment, FIG. 14 is a perspective view illustrating a state where a spacer member and a pressing member according to a second embodiment are disposed in a frame, and FIG. 15 is a perspective view illustrating a relationship between a driven roller, the spacer member, and the pressing member according to the second embodiment.

Figure 16:
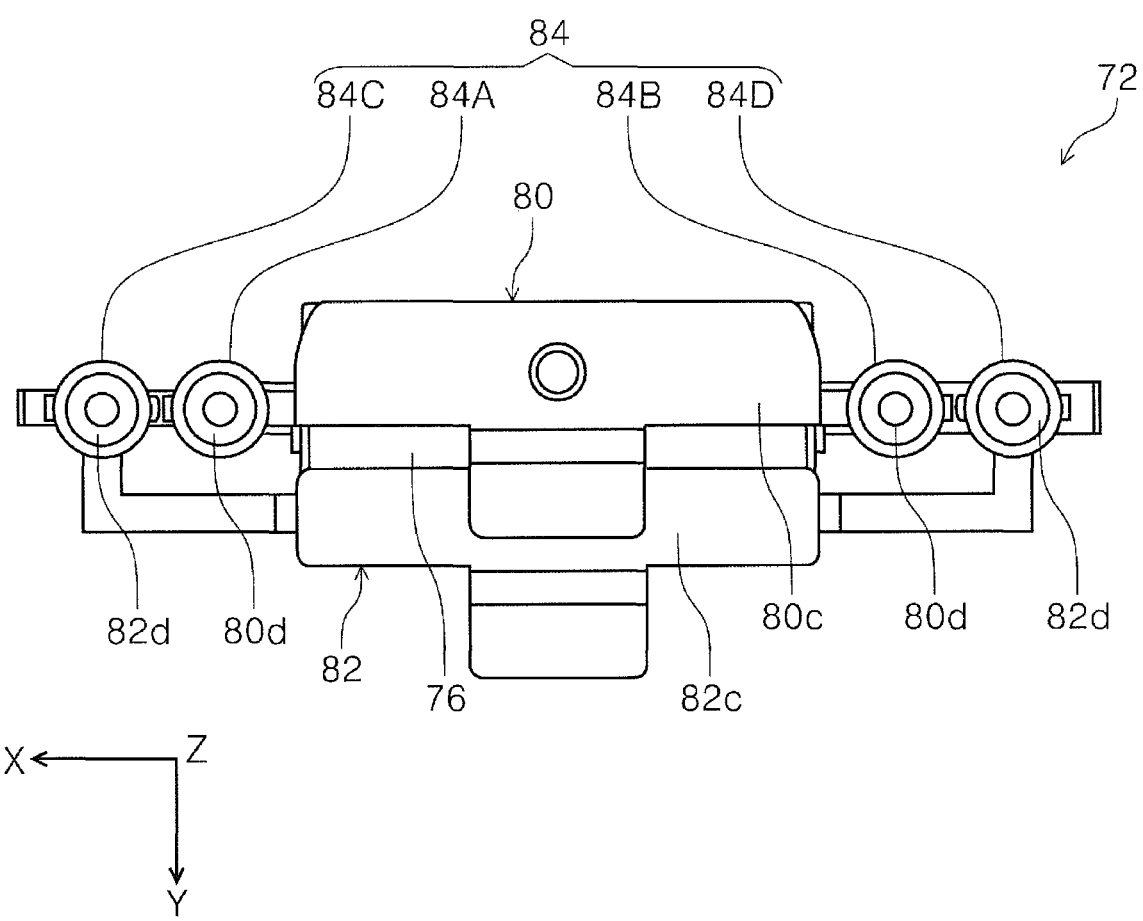
FIG. 16 is a plan view illustrating a relationship between the driven roller, the spacer member, and the pressing member according to the second embodiment.
Figure 17:
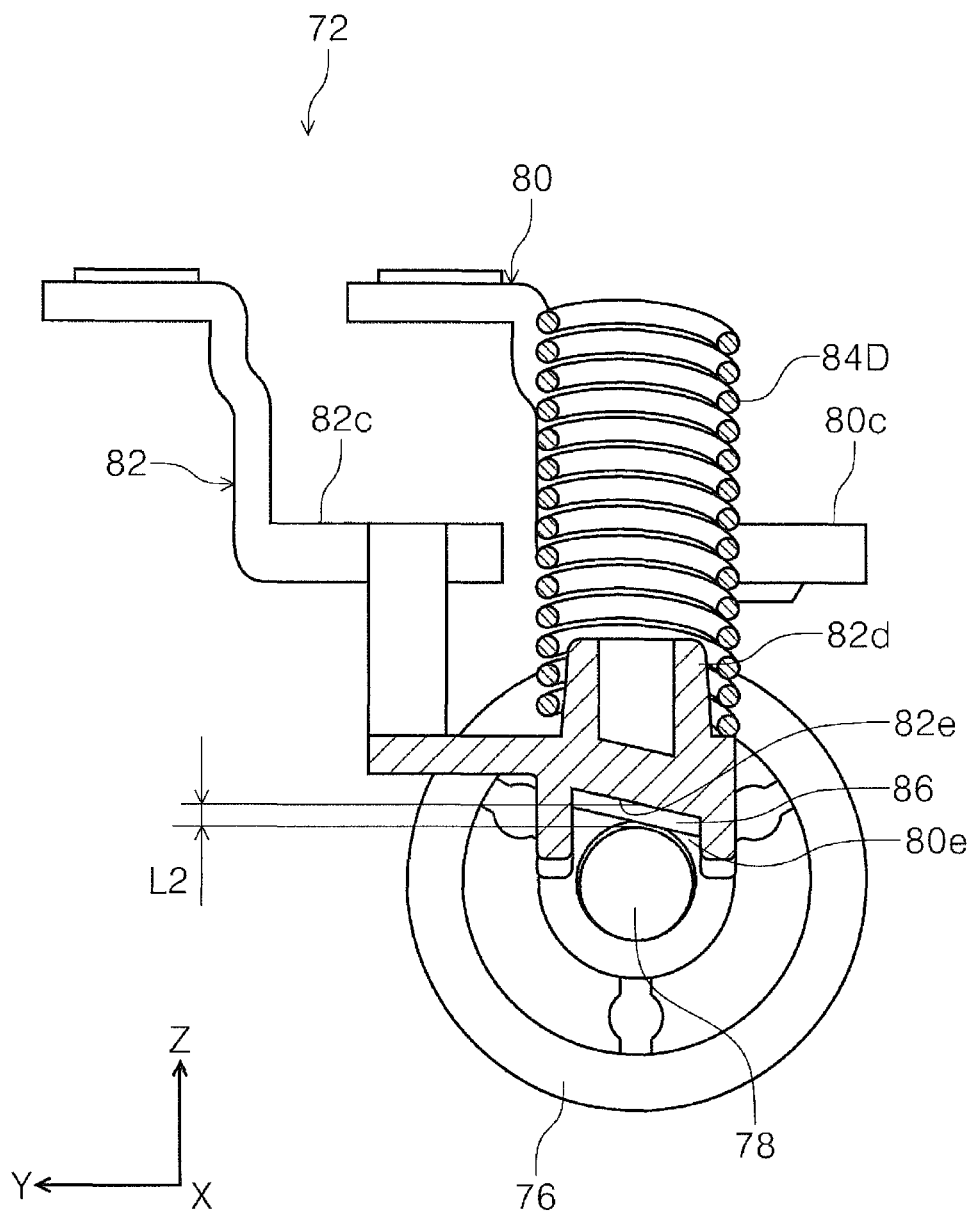
FIG. 17 is a side view illustrating a relationship between the driven roller, the spacer member, and the pressing member according to the second embodiment.
Figure 18:
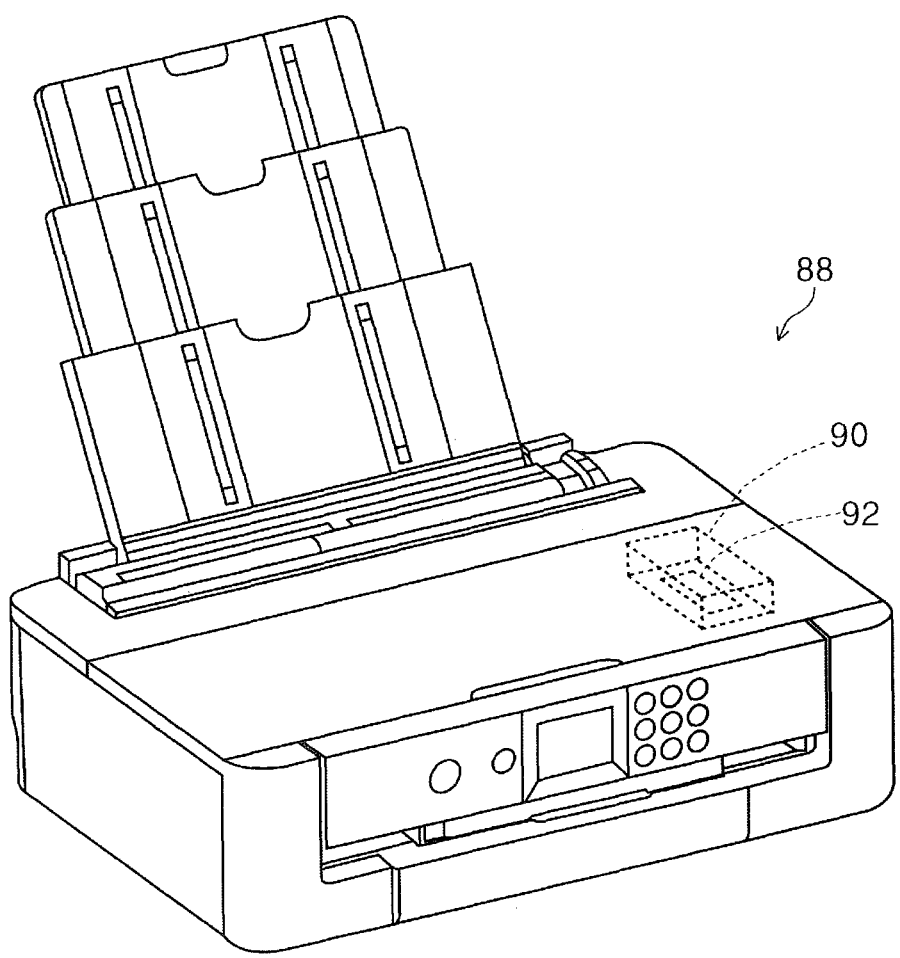
FIG. 18 is a perspective view of a recording apparatus provided with a medium transporting device according to each embodiment.

FIG. 16 is a plan view illustrating a relationship between the driven roller, the spacer member, and the pressing member according to the second embodiment, FIG. 17 is a side view illustrating a relationship between the driven roller, the spacer member, and the pressing member according to the second embodiment, and FIG. 18 is a perspective view of a recording apparatus provided with a medium transporting device according to each embodiment.

In addition, regarding the X-Y-Z coordinate system in each drawing, an X direction is an apparatus width direction and a paper sheet width direction, a Y direction is a paper sheet transportation direction in an image reading apparatus, and a Z direction is a direction orthogonal to the Y direction and a direction approximately orthogonal to a surface of a transported paper sheet. Note that, in each drawing, a +Y direction side is an apparatus front surface side and a −Y direction side is an apparatus rear surface side.

First Embodiment

In FIG. 1, a scanner 10 as an image reading apparatus will be described. The scanner 10 is provided with a lower unit 12, an upper unit 14, a medium placement unit 16, and a discharge tray 18. In the present embodiment, the upper unit 14 is attached to the lower unit 12 such that the upper unit 14 can rotate relative to the lower unit 12 with a +Y direction side end portion as a fulcrum although not shown.

A user interface unit 20 is provided on a front surface of the upper unit 14. For example, the user interface unit 20 is configured as a touch panel and functions as both of a display unit and an operation unit. By operating the user interface unit 20, it is possible to execute a medium reading operation or the like of the scanner 10. On a side close to the front surface of the scanner 10, a discharge port 22 is provided below the user interface unit 20. Below the discharge port 22, the discharge tray 18 is provided. In the present embodiment, the discharge tray 18 is configured so as to be able to switch between a state where the discharge tray 18 is accommodated in the lower unit 12 (FIGS. 1 and 2) and a deployed state (not shown) where the discharge tray 18 is drawn out from the lower unit 12 toward the side close to the front surface of the lower unit 12.

Document Transportation Path

In FIG. 2, a medium transportation path 24 in the scanner 10 will be described. Note that, a thick solid line with a symbol "P" in FIG. 2 illustrates a guidance path of a medium which is transported along the medium transportation path 24 in the scanner 10.

An apparatus rear surface side end portion of the lower unit 12 is provided with the medium placement unit 16. The medium placement unit 16 is configured to be able to support a medium (document) in an inclined posture. It is possible to set a plurality of media on the medium placement unit 16. The medium placement unit 16 is provided with a pair of edge guides 16a (FIG. 1) that can be displaced in a direction in which the edge guides 16a approach to each other or in a direction in which the edge guides 16a are separated from each other and the pair of edge guides 16a is configured to guide a side portion of a medium placed on the medium placement unit 16.

On the path of the medium transportation path 24 in the lower unit 12, a feed roller 26, a separation roller 28, an upstream side transportation unit 30 as "a pair of rollers", an image reading unit 32 as a "reading unit", and a downstream side transportation unit 34 as "a pair of rollers" are provided in a direction from the upstream side (−Y direction side) to the downstream side (+Y direction side) in a medium feeding direction. In the present embodiment, the feed roller 26 is driven to rotate by a drive source (not shown) provided in the lower unit 12, for example.

The separation roller 28 is positioned to face the feed roller 26. The separation roller 28 is provided in a state of being urged toward the feed roller 26 by an urging unit (not shown). When a plurality of media enter a space between the feed roller 26 and the separation roller 28, the separation roller 28 separates the plurality of media such that only the lowermost medium, which is to be fed, is fed to the downstream side in the feeding direction. A medium that is supported by the medium placement unit 16 in an inclined posture is nipped by the feed roller 26 and the separation roller 28 and is transported to the upstream side transportation unit 30 disposed on the downstream side in the feeding direction. Thereafter, the upstream side transportation unit 30 feeds a document fed from the feed roller 26 toward the image reading unit 32.

The image reading unit 32 is provided with a first reading unit 36A as a "path forming member" that is provided in the lower unit 12 to face a second surface of a medium transported along the medium transportation path 24 and a second reading unit 36B that is provided in the upper unit 14 to face a first surface of the medium transported along the medium transportation path 24. In the present embodiment, the first reading unit 36A and the second reading unit 36B are configured as a reading unit and for example, the first reading unit 36A and the second reading unit 36B are configured as a contact image sensor module (CISM).

A document that is fed to the image reading unit 32 by the upstream side transportation unit 30 is nipped by the downstream side transportation unit 34 positioned on the downstream side of the image reading unit 32 in the transportation direction and is discharged via the discharge port 22 after an image on at least one of the first and second surfaces of the medium P is read in the image reading unit 32.

Upstream Side Transportation Unit and Downstream Side Transportation Unit

In FIG. 3, the upstream side transportation unit 30 is provided on the upstream side of the image reading unit 32. In the present embodiment, the upstream side transportation unit 30 is provided with a driving roller 38 and a driven roller 40. The driving roller 38 is disposed on the lower unit 12 side and the driven roller 40 is disposed on the upper unit 14 side. The driven roller 40 is provided with a rotary shaft 42. The driven roller 40 is configured to be able to rotate with respect to the rotary shaft 42. The rotary shaft 42 is pressed toward the driving roller 38 by a pressing member 44.

As illustrated in FIG. 3, in the medium transportation path 24, the position of a rotary shaft center of the driving roller 38 in a Y-axis direction is set to a position Y1. Meanwhile, in the medium transportation path 24, the position of a rotary shaft center of the driven roller 40 in the Y-axis direction is a position Y2 which is offset from the position Y1 of the center of the driving roller 38 toward the +Y direction side (downstream side). Note that, an one-dot chain line denoted by a reference numeral "S1" in FIG. 3 is a tangent line that passes through a nip point N1 between the driving roller 38 and the driven roller 40 and a solid line denoted by a reference symbol "P1" illustrates a path of a medium P1 that passes through the upstream side transportation unit 30, the image reading unit 32, and the downstream side transportation unit 34.

Regarding the tangent line S1, since the position Y2, which is the position of the rotary shaft center of the driven roller 40 in the Y-axis direction, is offset from the position Y1, which is the position of the rotary shaft center of the driving roller 38 in the Y-axis direction, toward the +Y direction side (downstream side), the nip point N1 is offset from the position Y1, which is the position of the rotary shaft center in the Y-axis direction, toward the +Y direction side. Therefore, the tangent line S1 is a downwardly inclined tangent line that is inclined to a −Z direction side toward the +Y direction side and the tangent line S1 extends toward the first reading unit 36A from the nip point N1.

Meanwhile, the downstream side transportation unit 34 is provided with a driving roller 46, a driven roller 48, a spacer member 50 which will be described later, and a pressing member 52. In the present embodiment, the driven roller 48 is provided with a rotary shaft 54. In the present embodiment, the driven roller 48 is configured to be able to rotate with respect to the rotary shaft 54. The rotary shaft 54 is pressed toward the driving roller 46 by the pressing member 52 via the spacer member 50.

In the medium transportation path 24, the position of a rotary shaft center of the driving roller 46 in a Y-axis direction is set to a position Y3. Meanwhile, in the medium transportation path 24, the position of a rotary shaft center of the driven roller 48 in the Y-axis direction is a position Y4 which is offset from the position Y3 of the center of the driving roller 46 toward the −Y direction side (upstream side). Note that, an one-dot chain line denoted by a reference numeral "S2" in FIG. 3 is a tangent line that passes through a nip point N2 between the driving roller 46 and the driven roller 48.

Since the position Y4, which is the position of the rotary shaft center of the driven roller 48 in the Y-axis direction, is offset from the position Y3, which is the position of the rotary shaft center of the driving roller 46 in the Y-axis direction, toward the −Y direction side (upstream side), the nip point N2 is offset from the position Y3 toward the −Y direction side. Therefore, the tangent line S2 is a tangent line that is inclined toward a +Z direction side as it goes toward the +Y direction side and the tangent line S2 extends in a +Z direction from the first reading unit 36A and passes through the nip point N2.

To summarize the path of the medium P1 in the image reading unit 32, the medium P1 is fed to the image reading unit 32 along the tangent line S1 by the upstream side transportation unit 30 and is fed from the image reading unit 32 toward the +Y direction side along the tangent line S2 by the downstream side transportation unit 34. Specifically, as illustrated in FIG. 3, the path of the medium P1 is configured as a path that is curved toward the −Z direction side such that the medium P1 is pressed toward the first reading unit 36A of the image reading unit 32. Note that, in the present embodiment, the Y-axis direction, which is the medium transportation direction, is set as a medium transportation direction in which the medium is transported approximately along the medium transportation path 24 and the Y-axis direction is not limited to a direction parallel to the tangent line S1 and the tangent line S2. More specifically, in the present embodiment, it can be said that the Y-axis direction is a direction parallel to a line that connects the rotary shaft center of the driving roller 38 and the rotary shaft center of the driving roller 46 to each other as seen in an X-axis direction.

Configuration of Driven Roller

In FIG. 4, a frame 56 that constitutes a portion of the upper unit 14 is provided with recess-shaped upstream side driven roller disposition portions 56a and recess-shaped downstream side driven roller disposition portions 56b. In the present embodiment, two upstream side driven roller disposition portions 56a of the frame 56 are provided while being separated from each other in the X-axis direction and two downstream side driven roller disposition portions 56b of the frame 56 are provided while being separated from each other in the X-axis direction. Note that, as illustrated in FIG. 11, each downstream side driven roller disposition portion 56b is provided with a bearing portion 56c that supports the rotary shaft 54 of the driven roller 48. The bearing portion 56c is configured to restrict displacement of the rotary shaft 54 in the Y-axis direction and not to restrict displacement of the rotary shaft 54 in the Z-axis direction. Note that, although not shown, each upstream side driven roller disposition portion 56a is also provided with a bearing portion having the same configuration as above and the bearing portion supports the rotary shaft 42 of the driven roller 40.

The driven roller 40 and the rotary shaft 42 thereof are inserted into the upstream side driven roller disposition portion 56a and the driven roller 48 and the rotary shaft 54 thereof are inserted into the downstream side driven roller disposition portion 56b. Note that, in the present embodiment, the rotary shafts 42 and 54 are set in the frame 56 in a state where the rotation thereof with respect to the frame 56 is restricted.

As illustrated in FIG. 5, the spacer member 50 is inserted into the downstream side driven roller disposition portion 56b such that the spacer member 50 is disposed above the driven roller 48 and the rotary shaft 54 set in the downstream side driven roller disposition portion 56b. Note that, the spacer member 50 is provided with a restricting portion 50d, which will be described later.

When the spacer member 50 is inserted into the downstream side driven roller disposition portion 56b of the frame 56 with the restricting portion 50d of the spacer member 50 facing the −Y direction side, the restricting portion 50d interferes with the frame 56 and thus the spacer member 50 cannot be attached. On the other hand, when the spacer member 50 is inserted into the downstream side driven roller disposition portion 56b with the restricting portion 50d facing the +Y direction side, the restricting portion 50d does not interfere with the frame 56 and thus the spacer member 50 can be inserted into the downstream side driven roller disposition portion 56b.

In FIG. 6, regarding the driven roller 40 and the rotary shaft 42 which are disposed in the upstream side driven roller disposition portion 56a, the pressing member 44 is disposed to press the opposite end portions of the rotary shaft 42 in the X-axis direction from the +Z direction side. In the present embodiment, the pressing member 44 presses the rotary shaft 42 such that the driven roller 40 is pressed toward the driving roller 38.

In the present embodiment, the pressing member 44 is provided with a first pressing member 44A and a second pressing member 44B. The first pressing member 44A is disposed on one axial end portion of the rotary shaft 42 and the second pressing member 44B is disposed on the other axial end portion of the rotary shaft 42, the one axial end portion of the rotary shaft 42 being an axial end portion on a +X direction side and the other axial end portion being an axial end portion on a −X direction side. In the present embodiment, the first pressing member 44A and the second pressing member 44B are configured as a coil spring, for example.

Meanwhile, regarding the driven roller 48, the rotary shaft 54, and the spacer member 50 which are disposed in the downstream side driven roller disposition portion 56b, the pressing member 52 is disposed to press the opposite end portions of the rotary shaft 54 in the X-axis direction from the +Z direction side via the spacer member 50 which will be described later. In the present embodiment, the pressing member 52 presses the rotary shaft 54 such that the driven roller 48 is pressed toward the driving roller 46.

In the present embodiment, the pressing member 52 is provided with a first pressing member 52A and a second pressing member 52B. The first pressing member 52A is disposed on one axial end portion of the rotary shaft 54 and the second pressing member 52B is disposed on the other axial end portion of the rotary shaft 54, the one axial end portion of the rotary shaft 54 being an axial end portion on the +X direction side and the other axial end portion being an axial end portion on the −X direction side. In the present embodiment, the first pressing member 52A and the second pressing member 52B are configured as a coil spring, for example.

As illustrated in FIG. 7, a holding member 58 is attached to the frame 56. The holding member 58 engages with a +Z direction side end portion of each of the pressing members 44A, 44B, 52A, and 52B and holds the pressing members 44A, 44B, 52A, and 52B.

In FIGS. 8 and 9, the rotary shaft 54 of the driven roller 48 of the downstream side transportation unit 34 protrudes from the opposite end portions of the driven roller 48 in the X-axis direction. For example, when the +X direction side is referred to as one end side, cut-out portions 54a and 54b are formed on an end portion of the rotary shaft 54 on the one end side. In the present embodiment, the cut-out portion 54a and the cut-out portion 54b are disposed to face each other. When the rotary shaft 54 is attached to the frame 56, the cut-out portions 54a and 54b engage with the bearing portion 56c and rotation of the rotary shaft 54 with respect to the frame 56 is restricted.

The spacer member 50 is provided with a first spacer 50a, a second spacer 50b, a connection portion 50c, and the restricting portion 50d. The connection portion 50c extends in the X-axis direction and connects the first spacer 50a and the second spacer 50b to each other. In addition, the restricting portion 50d extends toward the +Y direction side after protruding from the connection portion 50c in the +Z direction. Note that, in the present embodiment, the driving roller 46, the driven roller 48, the rotary shaft 54, the first pressing member 44A, the second pressing member 44B, and the spacer member 50 constitute a medium transporting device 60 (FIGS. 3 and 10), for example.

On each of the first spacer 50a and the second spacer 50b, a projection 50e which protrudes in the +Z direction and to which the pressing member 52A or the pressing member 52B is inserted is formed. Furthermore, an inclined surface 50f is formed on a lower portion of each of the first spacer 50a and the second spacer 50b.

In FIG. 10, the projection 50e of the first spacer 50a is inserted into a −Z direction side end portion of the first pressing member 52A and the first pressing member 52A and the first spacer 50a engage with each other. The first spacer 50a is interposed between the first pressing member 52A and the rotary shaft 54 and the first spacer 50a presses one axial end of the rotary shaft 54 due to a pressing force from the first pressing member 52A.

The projection 50e of the second spacer 50b is inserted into a −Z direction side end portion of the second pressing member 52B and the second pressing member 52B and the second spacer 50b engage with each other. The second spacer 50b is interposed between the second pressing member 52B and the rotary shaft 54 and the second spacer 50b presses the other axial end of the rotary shaft 54 due to a pressing force from the second pressing member 52B.

Note that, in the present embodiment, since the driven roller 48 and the rotary shaft 54 are configured to be inserted into the downstream side driven roller disposition portion 56b, the driven roller 48 and the rotary shaft 54 can be displaced toward the +Z axis direction side against the pressing forces from the first pressing member 52A and the second pressing member 52B. Note that, although not shown, since the driven roller 40 and the rotary shaft 42 of the upstream side transportation unit 30 are also configured to be inserted into the upstream side driven roller disposition portion 56a, the driven roller 40 and the rotary shaft 42 can be displaced toward the +Z axis direction side against the pressing forces from the first pressing member 44A and the second pressing member 44B.

In FIG. 11, the inclined surface 50f is provided on a lower portion of each of the first spacer 50a and the second spacer 50b. For example, the inclined surface 50f is an upwardly inclined surface that extends to the +Z direction side toward the +Y direction side. The inclined surface 50f engages with the rotary shaft 54 and presses the rotary shaft 54 due to a pressing force from the first pressing member 52A and the second pressing member 52B. Note that, although FIG. 11 illustrates the second spacer 50b, the first spacer 50a also has a configuration as illustrated in FIG. 11.

Here, in FIGS. 3 and 12, forces acting on the rotary shafts 42 and 54 and the spacers 50a and 50b will be described. In FIG. 3, the nip point N1 of the upstream side transportation unit 30 is offset from the position Y1, which is the position of the rotary shaft center of the driving roller 38 in the Y-axis direction, toward the +Y direction side. Therefore, the rotary shaft 42 is urged to move to the +Y direction side due to the pressing forces from the first pressing member 44A and the second pressing member 44B. Here, when the medium P1 is transported, the driven roller 40 and the rotary shaft 42 are urged to move toward the +Y direction side while receiving a medium transportation force, by which the medium P1 is fed to the +Y direction side, in accordance with transportation of the medium P1.

In the present embodiment, when the medium P1 is transported, the rotary shaft 42 receives the pressing forces from the first pressing member 52A and the second pressing member 52B and the medium transportation force and is pressed toward the +Y direction side with respect to the bearing portion (not shown) of the upstream side driven roller disposition portion 56a. As a result, the position of the rotary shaft 42 is fixed and thus the rotary shaft 42 is not likely to move (vibrate) in the Y-axis direction (medium transportation direction).

Meanwhile, the nip point N2 of the downstream side transportation unit 34 is offset from the position Y3, which is the position of the rotary shaft center of the driving roller 46 in the Y-axis direction, toward the −Y direction side. Therefore, the rotary shaft 54 is urged to move to the −Y direction side due to the pressing forces from the first pressing member 52A and the second pressing member 52B. In contrast, when the medium P1 is transported, the driven roller 40 and the rotary shaft 42 are urged to move toward the +Y direction side while receiving the medium transportation force, by which the medium P1 is fed to the +Y direction side, in accordance with transportation of the medium P1.

As a result, when the medium P1 is transported, the rotary shaft 54 receives the pressing forces from the first pressing member 52A and the second pressing member 52B by which the rotary shaft 54 is pressed toward the −Y direction side and the medium transportation force by which the rotary shaft 54 is pressed toward the +Y direction side and thus the position of the rotary shaft 54 with respect to the bearing portion 56c (FIGS. 11 and 12) of the downstream side driven roller disposition portion 56b is not likely to be fixed. Since the position of the rotary shaft 54 with respect to the bearing portion 56c is not likely to be fixed, the rotary shaft 54 is likely to move (vibrate) in the Y-axis direction (medium transportation direction).

Therefore, as illustrated in FIG. 12, the inclined surface 50f which engages with the rotary shaft 54 is formed on a lower portion of each of the first spacer 50a and the second spacer 50b. The inclined surface 50f is inclined with respect to the Y-axis direction by an angle θ1.

In the present embodiment, the first pressing member 52A presses the first spacer member 50a in a −Z direction with a pressing force F1. Here, the inclined surface 50f of the first spacer 50a and the rotary shaft 54 abut onto each other. Accordingly, the rotary shaft 54 is pressed by the first pressing member 52A via the first spacer 50a. Specifically, the rotary shaft 54 is pressed in a direction intersecting the inclined surface 50f with a force F2. As illustrated in FIG. 12, the force F2 can be divided into a force component F2y that presses the rotary shaft 54 in the +Y direction and a force component F2z that presses the rotary shaft 54 in the −Z direction. That is, the inclined surface 50f is configured such that a force component that presses the rotary shaft 54 in the +Y direction (to downstream side in medium transportation direction) is generated.

Here, when the medium P1 is transported, the driven roller 48 and the rotary shaft 54 receive a +Y direction side transportation force that acts along the path of the medium P1 as illustrated in FIG. 3. The medium P1 is fed to the downstream side in the transportation direction in a state of being inclined with respect to the Y-axis direction by an angle θ2. As a result, the rotary shaft 54 receives a force that presses the rotary shaft 54 in the +Y direction and a force that presses the rotary shaft 54 in the +Z direction via the driven roller 48.

In FIG. 12, when a force that presses the rotary shaft 54 in the +Z direction is referred to as a pressing force F3, the pressing force F3 can be divided into a force component F3y that presses the rotary shaft 54 in the −Y direction and a force component F3z that presses the rotary shaft 54 in the +Z direction.

Here, since the Y direction force component F2y of the force F2 from the first pressing member 52A which the rotary shaft 54 receives is greater than the Y direction force component F3y of the pressing force F3, the first spacer 50a and the rotary shaft 54 are relatively moved along the inclined surface 50f. As a result, the first spacer 50a is pressed against a −Y direction side end portion of the bearing portion 56c. Meanwhile, the rotary shaft 54 is pressed against a +Y direction side end portion of the bearing portion 56c.

Furthermore, when the medium P1 is transported, the rotary shaft 54 receives a transportation force F4 by which the medium P1 is transported. The transportation force F4 acts such that the rotary shaft 54 is pressed against the +Y direction side end portion. Specifically, the transportation force F4 can be divided into a force component F4y that presses the rotary shaft 54 in the +Y direction and a force component F4z that presses the rotary shaft 54 in the +Z direction. In the present embodiment, the rotary shaft 54 receives the Y direction force component F2y and the Y direction force component F4y of the transportation force F4 and thus is reliably retained in a state of being pressed against the +Y direction side end portion of the bearing portion 56c. As a result, the position of the rotary shaft 54 is fixed and thus the rotary shaft 54 is not likely to move (vibrate) in the Y-axis direction (medium transportation direction) at the time of transportation of the medium P1.

In the present embodiment, a magnitude relationship between the Y direction component F2y and the Z direction component F2z of the force F2 changes depending on the size of the angle θ1 of the inclined surface 50f. In the present embodiment, the angle θ1 is set to a value such that the Z direction component F2z of the force F2 is experimentally maximized when the angle θ1 is changed.

Modification Example of First Embodiment

In the present embodiment, the spacer member 50 is provided only in the downstream side transportation unit 34. However, the spacer member 50 may be applied to the upstream side transportation unit 30. For example, when a path configuration in which the driving rollers 38 and 46 are provided on the upper unit 14 side, the driven rollers 40 and 48 are disposed on the lower unit 12 side, and the medium is pressed toward the first reading unit 36A side is adopted, the position of the rotary shaft 42 of the driven roller 40 of the upstream side transportation unit 30 becomes unstable. When the spacer member 50 is applied to the rotary shaft 42 in this configuration, the position of the rotary shaft 42 can be stabilized.

To summarize the above description, the medium transporting device 60 includes the driving roller 46 that transports a medium and that is driven to rotate, the driven roller 48 that nips the medium between the driving roller 46 and the driven roller 48 and rotates in accordance with the rotation of the driving roller 46, the rotary shaft 54 of the driven roller 48, the first pressing member 52A that is disposed close to one axial end of the rotary shaft 54 and that presses the rotary shaft 54 in a direction in which the driven roller 48 comes into contact with the driving roller 46, the second pressing member 52B that is disposed close to the other axial end of the rotary shaft 54 and that presses the rotary shaft 54 in a direction in which the driven roller 48 comes into contact with the driving roller 46, and the spacer member 50 that is integrally provided with the first spacer 50a interposed between the rotary shaft 54 and the first pressing member 52A and the second spacer 50b interposed between the rotary shaft 54 and the second pressing member 52B.

According to this configuration, the first spacer 50a is interposed between the rotary shaft 54 and the first pressing member 52A at a position close to the one axial end of the rotary shaft 54 of the driven roller 48 and the second spacer 50b is interposed between the rotary shaft 54 and the second pressing member 52B at a position close to the other axial end of the rotary shaft 54. In addition, the first spacer 50a and the second spacer 50b are integrally provided with the spacer member 50. Therefore, it is possible to suppress vibration of the first spacer 50a and the second spacer 50b in the medium transportation direction in comparison with a configuration in which each of the first spacer 50a and the second spacer 50b is separately provided. As a result, it is possible to suppress movement (vibration) of the rotary shaft 54 in the medium transportation direction and to further suppress an adverse effect on a medium feeding accuracy or the generation of an abnormal noise.

The bearing portion 56c that supports the rotary shaft 54 is provided and a surface of each of the first spacer 50a and the second spacer 50b, which presses the rotary shaft 54, is formed as the inclined surface 50f that generates a force component that presses the rotary shaft 54 in the medium transportation direction in the bearing portion 56c. According to this configuration, it is possible to more favorably suppress movement (vibration) of the rotary shaft 54 in the medium transportation direction.

The inclined surface 50f is a surface that presses the rotary shaft 54 to the +Y direction side. The rotary shaft 54 is urged to move to the +Y direction side when the medium is transported. According to this configuration, since the inclined surface 50f is a surface that presses the rotary shaft 54 to the +Y direction side, a direction in which the first pressing member 52A and the second pressing member 52B press the rotary shaft 54 and a direction in which the rotary shaft 54 is urged to move when the medium is transported coincide with each other. Therefore, the rotary shaft 54 is reliably drawn to the +Y direction side and thus it is possible to more favorably suppress movement (vibration) of the rotary shaft 54 in the medium transportation direction.

The position Y4, which is the position of the rotary shaft center of the driven roller 48 in the Y-axis direction, is offset from the position Y3, which is the position of the rotary shaft center of the driving roller 46 in the Y-axis direction, toward the −Y direction side.

According to this configuration, the position Y4, which is the position of the rotary shaft center of the driven roller 48 in the Y-axis direction, is offset from the position Y3, which is the position of the rotary shaft center of the driving roller 46 in the Y-axis direction, toward the −Y direction side. Therefore, the rotary shaft 54 is urged to move to the −Y direction side with the rotary shaft 54 being pressed by the first pressing member 52A and the second pressing member 52B (in direction in which driven roller 48 is pressed against driving roller 46 and in which driven roller 48 comes into contact with driving roller 46). However, the rotary shaft 54 is urged to move to the +Y direction side when the medium is transported. As a result, the position of the rotary shaft 54 is not likely to be fixed and thus the rotary shaft 54 is likely to move (vibrate) in the medium transportation direction.

However, since the inclined surface 50f presses the rotary shaft 54 in the +Y direction side, the rotary shaft 54 moving (vibrating) in the medium transportation direction can be suppressed.

the driving rollers 38 and 46 and the driven rollers 40 and 48 press the medium toward the first reading unit 36A that is provided closer to the −Y direction side or the +Y direction side than the driving rollers 38 and 46 and the driven rollers 40 and 48, and the driving rollers 38 and 46 are positioned on the first reading unit 36A side.

the upstream side transportation unit 30 that transports the medium and the downstream side transportation unit 34 that is positioned closer to the +Y direction side than the upstream side transportation unit 30 and that transports the medium are provided, and the driving roller 46 and the driven roller 48 constitute the downstream side transportation unit 34 provided on the +Y direction side.

The frame 56 to which the spacer member 50 is attached is provided and the spacer member 50 is provided with the restricting portion 50d that restricts a direction in which the spacer member 50 is attached to the frame 56. According to this configuration, it is possible to suppress the spacer member 50 being attached in a wrong direction.

Each of the first pressing member 52A and the second pressing member 52B is configured with a coil spring and the projection 50e that is inserted into the coil spring is formed on each of the first spacer 50a and the second spacer 50b. According to this configuration, a positional relationship between the coil spring and the first spacer 50a and a positional relationship between the coil spring and the second spacer 50b are stabilized and thus it is possible to further suppress movement (vibration) of the rotary shaft 54 in the medium transportation direction.

Second Embodiment

The medium transporting device 60 which the scanner 10 includes may be replaced with a medium transporting device 72 according to the second embodiment, which will be described later. In the second embodiment, the medium transporting device 60 in the first embodiment further includes a third pressing member and a fourth pressing member. Hereinafter, in FIGS. 14 to 17, the medium transporting device 72 according to the second embodiment will be described. Note that, in FIGS. 14 to 17, the driving roller 46 is not shown.

The medium transporting device 72 is disposed in a downstream side driven roller disposition portion 74a of a frame 74. In FIGS. 15 to 17, the medium transporting device 72 is provided with a driven roller 76, a rotary shaft 78, a first spacer member 80, a second spacer member 82, and a pressing member 84 (first pressing member 84A, second pressing member 84B, third pressing member 84C, and fourth pressing member 84D). Note that, the pressing members 84A, 84B, 84C, and 84D are configured as coil springs. Note that, the first spacer member 80 and the second spacer member 82 have the same configuration as the spacer member 50 in the first embodiment.

A first spacer 80a is formed on a +X direction side end portion of the first spacer member 80 and a second spacer 80b is formed on a −X direction side end portion of the first spacer member 80. In the present embodiment, the first spacer 80a and the second spacer 80b are connected to each other by a connection portion 80c. A projection 80d that is inserted into the pressing member 84 is formed on an upper portion of each spacer and an inclined surface 80e is formed on a lower portion of each spacer.

A third spacer 82a is formed on a +X direction side end portion of the second spacer member 82 and a fourth spacer 82b is formed on a −X direction side end portion of the second spacer member 82. In the present embodiment, the third spacer 82a and the fourth spacer 82b are connected to each other by a connection portion 82c. A projection 82d that is inserted into the pressing member 84 is formed on an upper portion of each spacer and an inclined surface 82e is formed on a lower portion of each spacer.

In FIGS. 15 and 16, the third spacer 82a of the second spacer member 82 in the present embodiment is disposed close to the +X direction side than the first spacer 80a of the first spacer member 80 and the fourth spacer 82b of the second spacer member 82 is disposed close to the −X direction side than the second spacer 80b of the first spacer member 80.

In the present embodiment, the first pressing member 84A is disposed on the first spacer 80a, the second pressing member 84B is disposed on the second spacer 80b, the third pressing member 84C is disposed on the third spacer 82a, and the fourth pressing member 84D is disposed on the fourth spacer 82b.

In FIG. 17, each of the first spacer 80a and the second spacer 80b is configured to be in contact with the rotary shaft 78 at all times via the inclined surface 80e. In contrast, a gap 86 is formed between the rotary shaft 78 and the inclined surface 82e of each of the third spacer 82a and the fourth spacer 82b. In the present embodiment, the length of the gap 86 in the Z-axis direction is set to a distance L2.

In the present embodiment, when a medium that is not thick is transported, the rotary shaft 78 of the driven roller 76 is pressed up in the +Z direction by a displace amount smaller than the distance L2 against pressing forces from the first pressing member 84A and the second pressing member 84B. In this case, the pressing forces from the first pressing member 84A and the second pressing member 84B act on the driven roller 76 via the rotary shaft 78.

When a thick medium is transported, the driven roller 76 and the rotary shaft 78 are pressed up in the +Z direction by a displace amount equal to or greater than the distance L2 against the pressing forces from the first pressing member 84A and the second pressing member 84B. At this time, the rotary shaft 78 which is pressed up comes into contact with the third pressing member 84C and the fourth pressing member 84D. Accordingly, in addition to the pressing forces from the first pressing member 84A and the second pressing member 84B, pressing forces from the third pressing member 84C and the fourth pressing member 84D also act on the rotary shaft 78.

Accordingly, the magnitude of a pressing force acting on the driven roller 76 can be adjusted corresponding to the thickness of a medium to be transported. As a result, it is possible to favorably adjust a medium transportation force between the driving roller and the driven roller 76 corresponding to the thickness of the medium and to reliably transport various media which are different in thickness.

Furthermore, since the magnitude of a pressing force acting on the driven roller 76 is adjusted corresponding to the thickness of the medium to be transported, a period in which a load for driving the driving rollers 38 and 46 becomes large can be limited only to a period in which a large load needs to be applied and thus it is possible to suppress heat generated from a drive source such as a motor driving the driving rollers 38 and 46.

Modification Example of Second Embodiment

The first spacer member 80 and the second spacer member 82 in the present embodiment may also be applied to the upstream side transportation unit 30.

Third Embodiment

The medium transporting devices 60 and 72 which the scanner 10 includes may be replaced with a medium transporting device 70 according to the third embodiment, which will be described later.

In FIG. 13, the medium transporting device 70 according to the third embodiment will be described. The medium transporting device 70 is different from the second embodiment in a point that medium transporting device 70 is not provided with the first spacer member 80 and the second spacer member 82 in the second embodiment.

In FIG. 13, description will be made using the upstream side transportation unit 30 as an example. One axial end portion of the rotary shaft 42 of the driven roller 40 is pressed by the first pressing member 44A such that the one axial end portion presses the driven roller 40 toward the driving roller 38 (FIG. 3). Similarly, the other axial end portion of the rotary shaft 42 is pressed by the second pressing member 44B such that the other axial end portion presses the driven roller 40 toward the driving roller 38.

Near the one axial end portion of the rotary shaft 42, a third pressing member 62 is disposed close to the +X direction side than the first pressing member 44A. A +Z direction side end portion of the third pressing member 62 engages with the holding member 58 and is held by the holding member 58. Meanwhile, a gap 66 is formed between a −Z direction side end portion (lower end portion) of the third pressing member 62 and the rotary shaft 42. In the present embodiment, the length of the gap 66 in the Z-axis direction is set to a distance L1.

Near the other axial end portion of the rotary shaft 42, a fourth pressing member 64 is disposed close to the −X direction side than the second pressing member 44B. A +Z direction side end portion of the fourth pressing member 64 engages with the holding member 58 and is held by the holding member 58. Meanwhile, a gap 68 is formed between a −Z direction side end portion (lower end portion) of the fourth pressing member 64 and the rotary shaft 42. In the present embodiment, the length of the gap 68 in the Z-axis direction is also set to the distance L1. Note that, in the present embodiment, the third pressing member 62 and the fourth pressing member 64 are configured as coil springs as with the first pressing member 44A and the second pressing member 44B.

In the present embodiment, in a case where a medium (medium that is not thick) having the same size as an ordinary sheet, a thin paper, or the like passes through a space between the driving roller 38 and the driven roller 40, the driven roller 40 and the rotary shaft 42 are pressed up in the +Z direction by a displacement amount smaller than the distance L1 against the pressing forces from the first pressing member 44A and the second pressing member 44B. In this case, the pressing forces from the first pressing member 44A and the second pressing member 44B act on the driven roller 40 via the rotary shaft 42.

In a case where a medium (thick medium) having the same size as a thick sheet passes through a space between the driving roller 38 and the driven roller 40, the driven roller 40 and the rotary shaft 42 are pressed up in the +Z direction by a displace amount equal to or greater than the distance L1 against the pressing forces from the first pressing member 44A and the second pressing member 44B. At this time, the rotary shaft 42 which is pressed up comes into contact with the third pressing member 62 and the fourth pressing member 64. Accordingly, in addition to the pressing forces from the first pressing member 44A and the second pressing member 44B, pressing forces from the third pressing member 62 and the fourth pressing member 64 also act on the rotary shaft 42.

Accordingly, the magnitude of a pressing force acting on the driven roller 40 can be adjusted corresponding to the thickness of a medium passing through the space between the driving roller 38 and the driven roller 40. As a result, it is possible to favorably adjust a medium transportation force between the driving roller 38 and the driven roller 40 corresponding to the thickness of the medium and to reliably transport various media which are different in thickness.

Furthermore, since the magnitude of a pressing force acting on the driven roller 40 is adjusted corresponding to the thickness of the medium to be transported, a period in which a load for driving the driving rollers 38 and 46 becomes large can be limited only to a period in which a large load is necessary and thus it is possible to suppress heat generated from a drive source such as a motor driving the driving rollers 38 and 46.

Modification Example of Third Embodiment

Although the configuration according to the in the present embodiment is intended to be applied to the upstream side transportation unit 30, the configuration according to the present embodiment may also be applied to the downstream side transportation unit 34.

In the second and third embodiments, the third pressing members 62 and 84C that are disposed close to the one axial end of the rotary shafts 42 and 78 and that press the rotary shafts 42 and 78 in a direction in which the driven rollers 40 and 76 come into contact with the driving rollers 38 and 46 and the fourth pressing members 64 and 84D that are disposed close to the other axial end of the rotary shafts 42 and 78 and that press the rotary shafts 42 and 78 in a direction in which the driven rollers 40 and 76 come into contact with the driving rollers 38 and 46 are provided. The gaps 66, 68, and 86 are formed between the third pressing members 62 and 84C and the rotary shafts 42 and 78 and between the fourth pressing members 64 and 84D and the rotary shafts 42 and 78 in a state where the driving rollers 38 and 46 and the driven rollers 40 and 76 are in contact with each other and pressing forces from the third pressing members 62 and 84C and the fourth pressing members 64 and 84D act on the rotary shafts 42 and 78 when the driven rollers 40 and 76 are separated from the driving rollers 38 and 46 by a predetermined distance.

In order to accurately transport a thick medium, it is preferable to secure a large pressing force that presses the driven rollers 40 and 76 toward the driving rollers 38 and 46. However, when a large pressing force that presses the driven rollers 40 and 76 toward the driving rollers 38 and 46 is secured, a load for driving the driving rollers 38 and 46 becomes large even when a medium that is not thick is transported and thus heat generation of a drive source such as a motor driving the driving rollers 38 and 46 becomes significant, which is not preferable.

However, according to the above-described configuration, since the third pressing members 62 and 84C and the fourth pressing members 64 and 84D are provided separately from the first pressing members 44A and 84A and the second pressing members 44B and 84B such that the gaps 66, 68, and 86 are formed between the third pressing members 62 and 84C and the rotary shafts 42 and 78 and between the fourth pressing members 64 and 84d and the rotary shafts 42 and 78 in a state where the driving rollers 38 and 46 and the driven rollers 40 and 76 are in contact with each other, the pressing forces from the third pressing members 62 and 84C and the fourth pressing members 64 and 84D do not act on the rotary shafts 42 and 78 when a medium that is not thick is transported. Therefore, it is possible to suppress a load for driving the driving rollers 38 and 46.

In addition, when a thick medium is transported, the driven rollers 40 and 76 are separated from the driving rollers 38 and 46 by a predetermined distance such that the pressing forces from the third pressing members 62 and 84C and the fourth pressing members 64 and 84D act on the rotary shafts 42 and 78 and thus the thick medium can be reliably transported. Accordingly, a period in which a load for driving the driving rollers 38 and 46 becomes large can be limited only to a period in which a large load needs to be applied and thus it is possible to suppress heat generated from a drive source such as a motor driving the driving rollers 38 and 46.

The third spacer 82*a* is interposed between the rotary shaft 78 and the third pressing member 84C, the fourth spacer 82*b* is interposed between the rotary shaft 78 and the fourth pressing member 84D, and the third spacer 82*a* and the fourth spacer 82*b* are integrally formed with each other. According to this configuration, vibration of the third spacer 82*a* and the fourth spacer 82*b* in the Y-axis direction is suppressed. As a result, it is possible to suppress movement (vibration) of the rotary shaft 78 in the medium transportation direction and to further suppress an adverse effect on the medium feeding accuracy or the generation of an abnormal noise.

Modification Examples of Above-Described Embodiments (1) In the first and third embodiments, the inclined surfaces 50*f,* 80*e,* and 82*e* of the spacer member 50, the first spacer member 80, and the second spacer member 82 are configured as inclined surfaces which are inclined at the angle θ1. However, instead of being configured as described above, each of the inclined surfaces 50*f,* 80*e,* and 82*e* may be formed into a flat surface or a V-shaped surface.

(2) In the above-described embodiments, the medium transporting devices 60, 70, and 72 are applied to the scanner 10. However, the medium transporting devices 60, 70, and 72 may be applied to a printer 88 (FIG. 18). The printer 88 is provided with a carriage 90 and a recording head 92 as a "recording unit" is provided on a lower portion of the carriage 90.

It is a matter of course that the invention is not limited to the above-described embodiments, various modifications can be made within the scope of the invention described in the claims, and the modifications are also included within the scope of the invention.

The entire disclosure of Japanese Patent Application No. 2017-189833, filed Sep. 29, 2017 is expressly incorporated by reference herein.

What is claimed is:

1. A medium transporting device comprising:
   a driving roller that transports a medium and that is driven to rotate;
   a driven roller that nips the medium between the driving roller and the driven roller and rotates in accordance with the rotation of the driving roller;
   a rotary shaft of the driven roller;
   a first pressing member that is disposed close to one axial end of the rotary shaft and that presses the rotary shaft in a direction in which the driven roller comes into contact with the driving roller;
   a second pressing member that is disposed close to the other axial end of the rotary shaft and that presses the rotary shaft in the direction in which the driven roller comes into contact with the driving roller;
   a spacer member that is integrally provided with a first spacer interposed between the rotary shaft and the first pressing member and a second spacer interposed between the rotary shaft and the second pressing member, wherein the first and second spacers are integrally connected to each other through a connection portion that extends from the first spacer to the second spacer; and
   a bearing portion that supports the rotary shaft,
   wherein a surface of each of the first spacer and the second spacer, which presses the rotary shaft, is formed as an inclined surface that extends in an upward direction from a first end to a second end and that generates a force component that presses the rotary shaft in a medium transportation direction in the bearing portion.

2. The medium transporting device according to claim 1, wherein the inclined surface is a surface that presses the rotary shaft to a downstream side in the medium transportation direction.

3. The medium transporting device according to claim 2, wherein a rotary shaft center of the driven roller is offset from a rotary shaft center of the driving roller toward an upstream side in the medium transportation direction.

4. An image reading apparatus comprising:
   a reading unit that reads a surface of a medium; and
   the medium transporting device according to claim 3 that transports the medium.

5. An image reading apparatus comprising:
   a reading unit that reads a surface of a medium; and
   the medium transporting device according to claim 2 that transports the medium.

6. The medium transporting device according to claim 1, wherein the driving roller and the driven roller press the medium toward a path forming member that is provided on an upstream side or a downstream side of the driving roller and the driven roller in the medium transportation direction, and wherein the driving roller is positioned on the path forming member side.

7. An image reading apparatus comprising:
a reading unit that reads a surface of a medium; and
the medium transporting device according to claim 6 that transports the medium.

8. The medium transporting device according to claim 1,
wherein a pair of rollers that transports the medium and a pair of rollers that is positioned on a downstream side of the pair of rollers and that transports the medium are provided, and
wherein the driving roller and the driven roller constitute the pair of rollers provided on the downstream side.

9. An image reading apparatus comprising:
a reading unit that reads a surface of a medium; and
the medium transporting device according to claim 8 that transports the medium.

10. The medium transporting device according to claim 1, further comprising:
a frame to which the spacer member is attached,
wherein the spacer member is provided with a restricting portion that restricts a direction in which the spacer member is attached to the frame.

11. An image reading apparatus comprising:
a reading unit that reads a surface of a medium; and
the medium transporting device according to claim 10 that transports the medium.

12. The medium transporting device according to claim 1,
wherein each of the first pressing member and the second pressing member is configured with a coil spring, and
wherein a projection that is inserted into the coil spring is formed on each of the first spacer and the second spacer.

13. An image reading apparatus comprising:
a reading unit that reads a surface of a medium; and
the medium transporting device according to claim 12 that transports the medium.

14. The medium transporting device according to claim 1, further comprising:
a third pressing member that is disposed close to the one axial end of the rotary shaft and that presses the rotary shaft in a direction in which the driven roller comes into contact with the driving roller; and
a fourth pressing member that is disposed close to the other axial end of the rotary shaft and that presses the rotary shaft in a direction in which the driven roller comes into contact with the driving roller,
wherein a gap is formed between the third pressing member and the rotary shaft and between the fourth pressing member and the rotary shaft in a state where the driving roller and the driven roller are in contact with each other and pressing forces from the third pressing member and the fourth pressing member act on the rotary shaft when the driven roller is separated from the driving roller by a predetermined distance.

15. The medium transporting device according to claim 14,
wherein a third spacer is interposed between the rotary shaft and the third pressing member and a fourth spacer is interposed between the rotary shaft and the fourth pressing member, and
wherein the third spacer and the fourth spacer are integrally formed with each other.

16. An image reading apparatus comprising:
a reading unit that reads a surface of a medium; and
the medium transporting device according to claim 14 that transports the medium.

17. An image reading apparatus comprising:
a reading unit that reads a surface of a medium; and
the medium transporting device according to claim 1 that transports the medium.

18. A recording apparatus comprising:
a recording unit that performs recording on a medium; and
the medium transporting device according to claim 1.

19. A medium transporting device comprising:
a driving roller that transports a medium and that is driven to rotate;
a driven roller that nips the medium between the driving roller and the driven roller and rotates in accordance with the rotation of the driving roller;
a rotary shaft of the driven roller;
a first pressing member that is disposed close to one axial end of the rotary shaft and that presses the rotary shaft in a direction in which the driven roller comes into contact with the driving roller;
a second pressing member that is disposed close to the other axial end of the rotary shaft and that presses the rotary shaft in the direction in which the driven roller comes into contact with the driving roller; and
a spacer member that is integrally provided with a first spacer interposed between the rotary shaft and the first pressing member and a second spacer interposed between the rotary shaft and the second pressing member, wherein the first and second spacers are integrally connected to each other through a connection portion that extends from the first spacer to the second spacer;
a third pressing member that is disposed close to the one axial end of the rotary shaft and that presses the rotary shaft in the direction in which the driven roller comes into contact with the driving roller; and
a fourth pressing member that is disposed close to the other axial end of the rotary shaft and that presses the rotary shaft in the direction in which the driven roller comes into contact with the driving roller,
wherein a gap is formed between the third pressing member and the rotary shaft and between the fourth pressing member and the rotary shaft in a state where the driving roller and the driven roller are in contact with each other and pressing forces from the third pressing member and the fourth pressing member act on the rotary shaft when the driven roller is separated from the driving roller by a predetermined distance,
wherein a third spacer is interposed between the rotary shaft and the third pressing member and a fourth spacer is interposed between the rotary shaft and the fourth pressing member, and
wherein the third spacer and the fourth spacer are integrally formed with each other.

* * * * *